US 8,860,776 B2

(12) United States Patent
Long et al.

(10) Patent No.: US 8,860,776 B2
(45) Date of Patent: Oct. 14, 2014

(54) CONFERENCE TERMINAL, CONFERENCE SERVER, CONFERENCE SYSTEM AND DATA PROCESSING METHOD

(75) Inventors: Yanbo Long, Shenzhen (CN); Pulin Wang, Shenzhen (CN); Xiaoxia Wei, Shenzhen (CN); Wuzhou Zhan, Shenzhen (CN); Dongqi Wang, Shenzhen (CN)

(73) Assignee: Huawei Device Co., Ltd, Shenzhen (CN)

( * ) Notice: Subject to any disclaimer, the term of this patent is extended or adjusted under 35 U.S.C. 154(b) by 741 days.

(21) Appl. No.: 13/090,343

(22) Filed: Apr. 20, 2011

(65) Prior Publication Data

US 2011/0193932 A1   Aug. 11, 2011

Related U.S. Application Data

(63) Continuation of application No. PCT/CN2009/074492, filed on Oct. 16, 2009.

(30) Foreign Application Priority Data

Oct. 20, 2008   (CN) .......................... 2008 1 0224372
May 20, 2009   (CN) .......................... 2009 1 0202849

(51) Int. Cl.
| | |
|---|---|
| *H04N 7/14* | (2006.01) |
| *H04L 29/06* | (2006.01) |
| *H04L 12/18* | (2006.01) |
| *H04N 7/15* | (2006.01) |

(52) U.S. Cl.
CPC .......... *H04L 12/1827* (2013.01); *H04L 65/403* (2013.01); *H04N 7/152* (2013.01)
USPC .................. 348/14.07; 348/14.01; 348/14.08; 348/14.09

(58) Field of Classification Search
USPC .................... 348/14.01–14.16; 370/260–261; 709/204–205
See application file for complete search history.

(56) References Cited

U.S. PATENT DOCUMENTS

| | | | |
|---|---|---|---|
| 5,963,246 A | 10/1999 | Kato | |
| 6,466,250 B1 * | 10/2002 | Hein et al. | ................. 348/14.16 |
| 2003/0025681 A1 | 2/2003 | Hara | |
| 2004/0189793 A1 | 9/2004 | Wang et al. | |
| 2004/0212629 A1 * | 10/2004 | Ohkawa | ........................ 345/629 |

(Continued)

FOREIGN PATENT DOCUMENTS

| | | |
|---|---|---|
| CN | 1229949 | 9/1999 |
| CN | 1722075 | 1/2006 |

(Continued)

OTHER PUBLICATIONS

Office Action, dated Sep. 7, 2012, in corresponding Chinese Application No. 201110264011.7 (8 pp.).

(Continued)

*Primary Examiner* — Melur Ramakrishnaiah
(74) *Attorney, Agent, or Firm* — Huawei Device Co., Ltd

(57) ABSTRACT

A conference terminal, a conference server, a conference system, and a data processing method are provided. The conference terminal includes: a mark obtaining module, configured to obtain a mark data signal; an image obtaining module, configured to obtain an image data signal; a superimposing module, configured to superimpose the mark data signal onto the image data signal to generate a hybrid image data signal; and an outputting module, configured to output the hybrid image data signal. The present invention improves the interactivity between videoconference users and the discussion efficiency.

26 Claims, 17 Drawing Sheets

(56) References Cited

U.S. PATENT DOCUMENTS

| | | | |
|---|---|---|---|
| 2005/0024387 A1* | 2/2005 | Ratnakar et al. | 345/629 |
| 2007/0020604 A1 | 1/2007 | Chulet | |
| 2007/0171273 A1 | 7/2007 | Saleh et al. | |
| 2007/0200922 A1 | 8/2007 | Ueno et al. | |
| 2007/0219981 A1* | 9/2007 | Takaai et al. | 707/5 |
| 2007/0242813 A1 | 10/2007 | Horikiri et al. | |
| 2008/0079693 A1 | 4/2008 | Okamoto et al. | |

FOREIGN PATENT DOCUMENTS

| | | |
|---|---|---|
| CN | 101022352 | 8/2007 |
| CN | 101031063 | 9/2007 |
| CN | 101056386 | 10/2007 |
| CN | 200990138 | 12/2007 |
| CN | 101115183 | 1/2008 |
| CN | 101370115 | 2/2009 |
| CN | 101441539 | 5/2009 |
| JP | 6276335 | 9/1994 |
| JP | 6339139 | 12/1994 |
| JP | 89075 | 1/1996 |
| JP | 8237628 | 9/1996 |
| JP | 8-293925 | 11/1996 |
| JP | 11341458 | 12/1999 |
| JP | 2007235744 | 9/2007 |
| JP | 2007286780 | 11/2007 |
| KR | 10-2002-0027497 | 4/2002 |
| KR | 10-2007-0070645 | 7/2007 |
| KR | 10-2007-0076133 | 7/2007 |
| KR | 10-2008-0082565 | 9/2008 |
| WO | 2010/081337 | 7/2010 |

OTHER PUBLICATIONS

Notice to Submit a Response, dated Oct. 17, 2012, in corresponding Korean Application No. 10-2012-7022649 (6 pp.).

Notice of Reasons for Rejection, dated Oct. 18, 2012, in corresponding Japanese Application No. 2011-532485 (7 pp.).

Notice of Allowance, dated Feb. 8, 2013, in corresponding Korean Application No. 10-2012-7022649 (3 pp.).

Korean Notice of Allowance mailed Jan. 30, 2013 for corresponding Korean Application No. 10-2011-7022110.

International Search Report issued Dec. 31, 2009 in corresponding International Patent Application No. PCT/CN2009/07446.

Written Opinion of the International Searching Authority issued Dec. 31, 2009 in corresponding International Patent Application No. PCT/CN2009/07446.

First Chinese Office Action issued Feb. 12, 2010 in corresponding Chinese Patent Application No. 2008102447358.9.

Second Chinese Office Action issued May 4, 2011 in corresponding Chinese Patent Application No. 2008102447358.9.

Korean Office Action issued Jun. 29, 2012 in corresponding Korean Patent Application No. 10- 2011-7010848.

Extended European Search Report issued Aug. 9, 2012 in corresponding European Patent Application No. 09821578.3.

International Search Report, mailed Jan. 21, 2010, in corresponding International Application No. PCT/CN2009/074492 (4 pp.).

Notice of Allowance, dated Dec. 21, 2012, in corresponding Korean Application No. 10-2011-7010848 (3 pp.).

Written Opinion of the International Searching Authority, mailed Jan. 21, 2010, in International Application No. PCT/CN2009/074492.

Office Action, mailed Jun. 9, 2010, in Chinese Application No. 200910202849.6.

Office Action, mailed Dec. 14, 2010, in Chinese Application No. 200910202849.6.

* cited by examiner

CONFERENCE TERMINAL, CONFERENCE SERVER, CONFERENCE SYSTEM AND DATA PROCESSING METHOD

CROSS-REFERENCE TO RELATED APPLICATIONS

This application is a continuation of International Application No. PCT/CN2009/074492, filed on Oct. 16, 2009, which claims priority to Chinese Patent Application No. 200810224372.7, filed on Oct. 20, 2008 and Chinese Patent Application No. 200910202849.6, filed on May 20, 2009, all of which are hereby incorporated by reference in their entireties.

FIELD OF THE INVENTION

The present invention relates to videoconference systems, and in particular, to a conference terminal, a conference server, a conference system, and a data processing method.

BACKGROUND OF THE INVENTION

In the earliest videoconference, people interact with each other through images and sounds only. Later, the H.261 protocol enables participants of the videoconference to transfer a static graphic file of a 4CIF size through a motion video channel so that the participants can share slides with each other. However, the sharing is implemented by contending for the motion video channel. The resolution of the slides is not high, and the transmission of slides tends to cause a pause of motion videos.

Later, the H.239 protocol enables participants to create an H.239 auxiliary stream channel to transmit slides exclusively and use a mainstream channel to transmit motion videos. Therefore, no mutual impact exists between transmission of motion videos and transmission of slides. A typical application scenario is shown in FIG. 1. A conference terminal 12 receives a conference image taken by a camera 11 and a file (such as a PPT or Word file) of a computer 10 simultaneously, and performs video encoding for the conference image and the file (generally based on the H.263 or H.264 protocol). Afterward, through a channel provided by the H.239 protocol, the conference terminal 12 sends the two video streams to a Multipoint Control Unit (MCU) 13 simultaneously, and the MCU 13 forwards the video streams to another terminal 14 in the conference. After receiving the two video streams, the terminal 14 decodes them to obtain two different streams of video images, and displays them on a projector 16 or a TV set 15. In this way, any participant can share files with all other participants, and simple data exchange is realized. However, a noticeable drawback of this mode of sharing slides is: The participants cannot interact with each other. When a speech-maker expounds the slides, other participants watch the slides but cannot make marks on the slides, which reduces the discussion efficiency and deteriorates interactivity.

In view of the drawback, another solution is put forward in the conventional art to enable the interaction between participants of the videoconference by means of making marks on an electronic whiteboard. As shown in FIG. 2, an electronic whiteboard server 20 is deployed on the conference server side, and an electronic whiteboard client is deployed on each videoconference terminal, for example, client 21, client 22, client 23, client 24, and client 25. Such clients are generally Personal Computers (PCs), and some clients may be conference servers or conference clients in the conference subsystem. All clients are connected to the electronic whiteboard server 20 through a network. The electronic whiteboard server 20 starts an electronic whiteboard, which may be a blank background. Alternatively, a picture or a slide may be used as the background. The electronic whiteboard server 20 sends the content on the electronic whiteboard to all clients in the form of pictures. Therefore, each client can see the same content, and the participant can make marks on the electronic whiteboard through the client, for example, draw lines or circles or input texts on the electronic whiteboard. Such operations are transmitted onto the electronic whiteboard server 20. After receiving the operations performed by the client, the electronic whiteboard server 20 updates the content of the electronic whiteboard, and sends the updated content to all clients. In this way, all participants share the whiteboard to have a discussion. However, this mode is restricted in the scope of use. For example, a user is unable to mark a slide directly, namely, the system is unable to share a marked slide. Besides, the system needs to create another electronic whiteboard system, and at least one computer needs to be configured on each conference site, which increases the system complexity and the construction costs.

In the conventional art, another method, namely, remote collaboration, is similar to the method of marking the electronic whiteboard. As shown in FIG. 3, the system includes a remote collaboration server 30; and a computer is configured for each videoconference site, for example, computer 31, computer 32, computer 33, and computer 34. Such computers are connected with the remote collaboration server 30 through a network. On a conference site which needs to share its desktop with other participants, a remote collaboration server is started, and the computer desktop image (such as a PPT or Word file) of this conference site is shared with all other participants. After being connected to the remote collaboration server 30 through a local computer, the participants of other conference sites can see the computer desktop offered by the remote collaboration server 30 for sharing. At the same time, the operations performed through the local mouse and keyboard are transmitted to the remote collaboration server 30. Therefore, all participants can operate the same application such as a PPT or Word jointly. However, this system also involves an extra remote collaboration system, and at least one computer needs to be configured for each conference site, which increases the system complexity and the construction costs. Moreover, special remote collaboration parameters need to be configured on each computer of each conference site, and a user needs to operate two systems, for example, a shared remote system and a local system. The files such as PPT and Word files for sharing need to be copied into the computer of the conference site beforehand, and the plug-and-play feature available on a notebook computer cannot be realized, which leads to inconvenience of operations.

Therefore, at least the following problems exist in the conventional art:

In a videoconference system, when participants exchange data, the interactive data offered by the videoconference system in the conventional art to the participants is restricted. For example, in a system with electronic whiteboards, slides cannot be marked. Moreover, the videoconference systems such as electronic whiteboards are complicated and costly.

SUMMARY OF THE INVENTION

Embodiments of the present invention provide a conference terminal, a conference server, a conference system, and a data processing method to implement data exchange between any conference terminals without increasing complexity of the conference system and to improve discussion efficiency of the conference users.

Embodiments of the present invention provide the following technical solution:

An embodiment of the present invention provides a conference terminal, including:

a mark obtaining module, configured to obtain a mark data signal;

an image obtaining module, configured to obtain an image data signal;

a superimposing module, configured to superimpose the mark data signal onto the image data signal to generate a hybrid image data signal; and an outputting module, configured to output the hybrid image data signal.

An embodiment of the present invention provides a conference server, including:

an image data receiving module, configured to receive an image data signal sent by a conference terminal;

a mark receiving module, configured to receive a mark data signal sent by the conference terminal;

a superimposing module, configured to superimpose the mark data signal onto the image data signal to generate hybrid image data; and a sending module, configured to send the hybrid image data, or the image data signal, or the mark data signal.

An embodiment of the present invention provides a conference system, including a first conference terminal, a conference server, and at least one second conference terminal.

The first conference terminal includes:

an image obtaining module, configured to obtain an image data signal sent by the conference server; and a mark sending module, configured to obtain a mark data signal, and send the mark data signal to the conference server.

The conference server includes:

an image data receiving module, configured to receive the image data signal;

a mark receiving module, configured to receive the mark data signal;

a superimposing module, configured to superimpose the mark data signal onto the image data signal to generate hybrid image data; and a sending module, configured to send the hybrid image data to the first conference terminal and at least one second conference terminal.

The at least one second conference terminal is configured to receive and display the hybrid image data.

An embodiment of the present invention provides another conference system, including a first conference terminal, a conference server, and at least one second conference terminal.

The first conference terminal includes:

an image obtaining module, configured to obtain an image data signal sent by the conference server; and a mark sending module, configured to obtain a mark data signal, and send the mark data signal to the conference server.

The conference server is configured to receive the image data signal and the mark data signal, and forward the signals.

The at least one second conference terminal includes:

a first timer, configured to generate a first time interval value;

an image obtaining module, configured to obtain the image data signal forwarded by the conference server;

a first external mark obtaining module, configured to: obtain the mark data signal forwarded by the conference server, output the mark data signal according to the first time interval value, and generate a first mark data signal;

a first superimposing module, configured to superimpose the first mark data signal onto the image data signal to generate a first hybrid image data signal; and a displaying module, configured to display the first hybrid image data signal.

An embodiment of the present invention provides a conference system, including a first conference terminal, a conference server, and at least one second conference terminal.

The first conference terminal includes:

a first timer, configured to generate a first time interval value;

a second timer, configured to generate a second time interval value;

a first internal mark obtaining module, configured to: obtain a mark data signal sent by a local conference terminal, output the mark data signal according to the first time interval value, and generate a first mark data signal;

a second internal mark obtaining module, configured to: obtain the mark data signal sent by the local conference terminal, output the mark data signal according to the second time interval value, and generate a second mark data signal;

a second superimposing module, configured to superimpose the first mark data signal onto the image data signal to generate second hybrid image data; and a second sending module, configured to send the first hybrid image data to a display screen of the local conference terminal, or send the second hybrid image data to the conference server through an auxiliary stream channel.

The conference server is configured to receive the second hybrid image data and forward the data.

The second conference terminal is configured to receive the second hybrid image data and display the data.

An embodiment of the present invention provides a data processing method, including:

obtaining an image data signal;

obtaining a mark data signal;

superimposing the mark data signal onto the image data signal to generate a hybrid image data signal; and outputting the hybrid image data signal.

An embodiment of the present invention provides another data processing method, including:

receiving an image data signal and a mark data signal sent by a conference terminal;

superimposing the mark data signal onto the image data signal to generate hybrid image data; and sending the hybrid image data, or the image data signal, or the mark data signal to the conference terminal.

The embodiments of the present invention bring the following benefits:

In the foregoing technical solution, the conference terminal superimposes the mark data signal onto the image data signal to generate a hybrid image data signal (for example, the hybrid image data signal is a marked slide). In this way, the conference terminal enables a participant to add marks onto the slide when watching the slide, the interactivity between the videoconference users is improved, and the discussion efficiency is improved without increasing complexity of the conference system.

BRIEF DESCRIPTION OF THE DRAWINGS

To make the technical solution under the present invention or in the prior art clearer, the following outlines the accompanying drawings involved in the description of the embodiments of the present invention or the prior art. Apparently, the accompanying drawings outlined below are exemplary only

DETAILED DESCRIPTION OF THE EMBODIMENTS

To make the technical problems to be solved by embodiment of the present invention, the technical solution and merits of the present invention clearer, the following describes the present invention in more detail with reference to accompanying drawings and some exemplary embodiments.

Considering that the prior art is unable to combine the dual-stream function of the H.239 standard with the marking function similar to marking an electronic whiteboard at the user's will and does not enable enough interactivity between the users, the embodiments of the present invention provide a conference terminal, a conference server, a conference system, and a data processing method in the conference system.

First Embodiment of Conference Terminal

Figure 1:
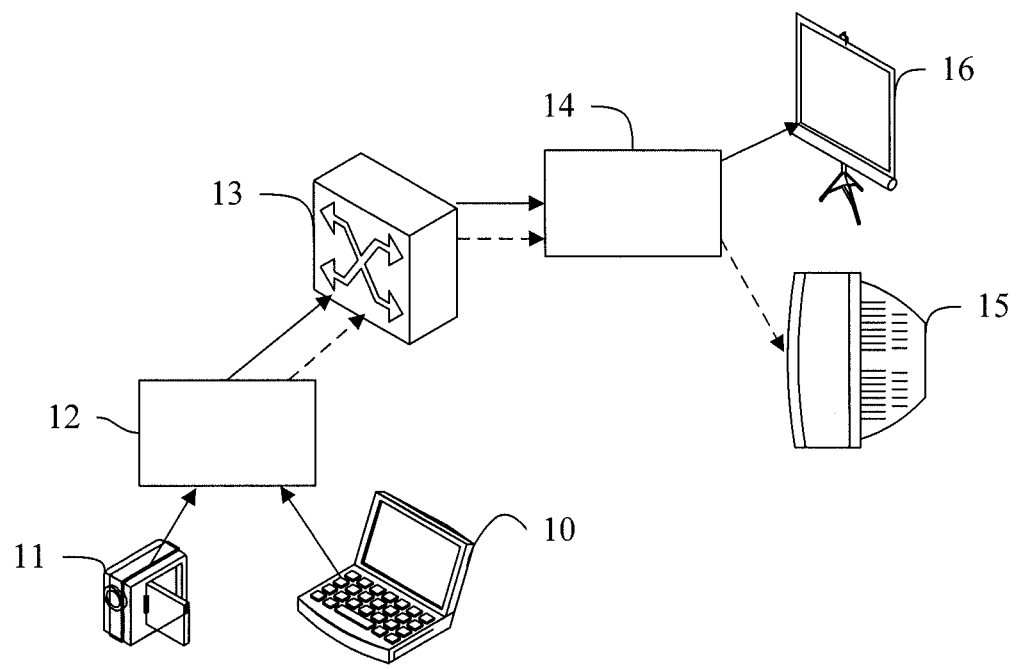
FIG. 1 is a schematic structural diagram of an application scenario of a conference system in the prior art.
Figure 2:
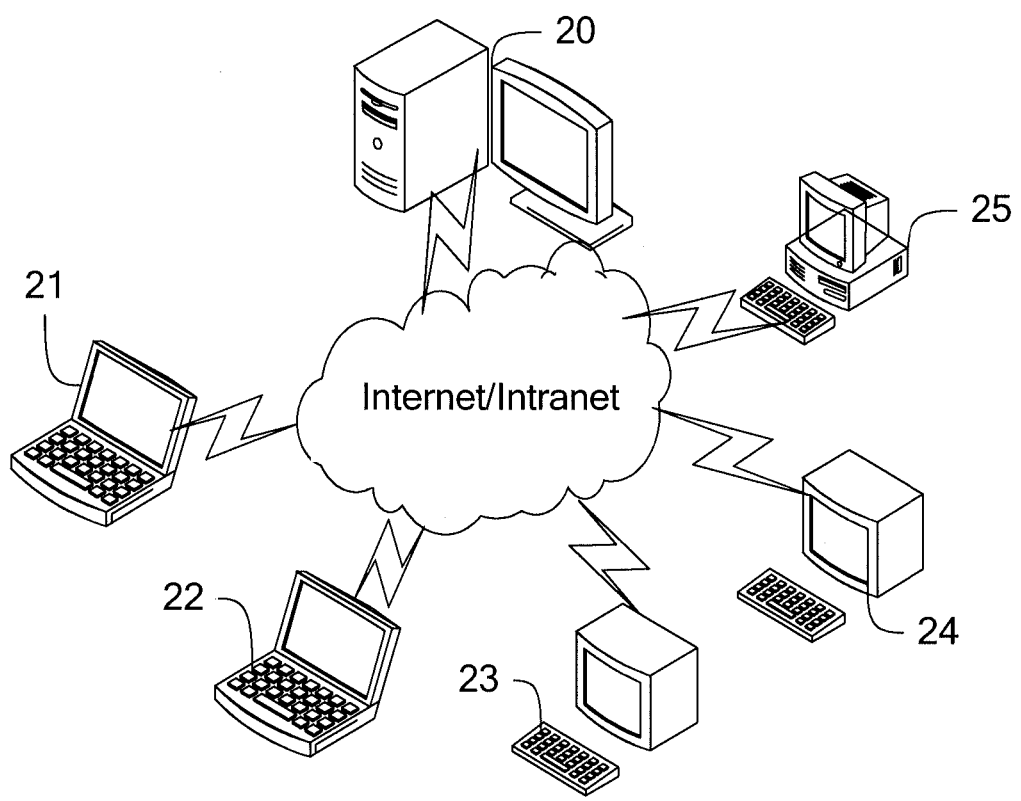
FIG. 2 is a schematic structural diagram of an application scenario using an electronic whiteboard for interactions in a conference system in the prior art.
Figure 3:
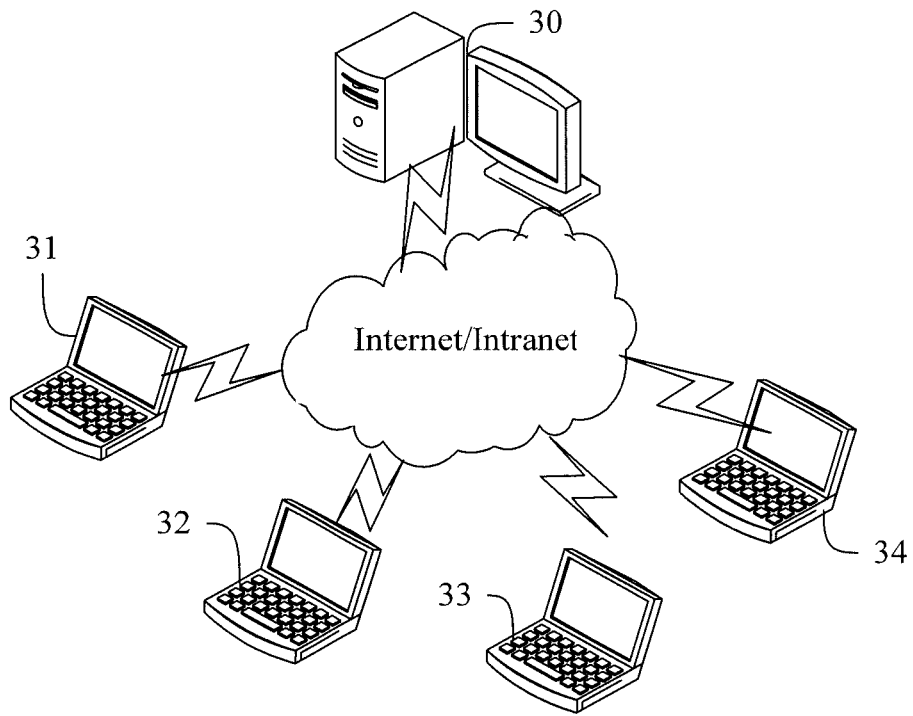
FIG. 3 is a schematic structural diagram of an application scenario using a remote collaboration server for interactions in a conference system in the prior art.
Figure 4:
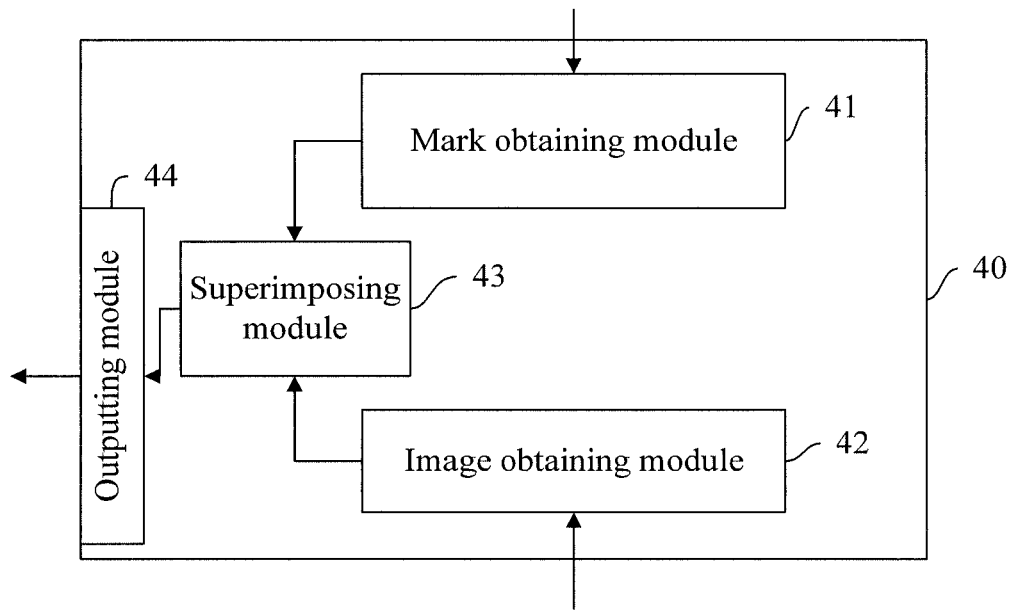
FIG. 4 is an overall schematic diagram of a structure of a conference terminal according to an embodiment of the present invention.

FIG. 4 is a schematic structural diagram of a conference terminal. The conference terminal 40 in this embodiment includes:

a mark obtaining module 41, configured to obtain a mark data signal;

an image obtaining module 42, configured to obtain an image data signal;

a superimposing module 43, configured to superimpose the mark data signal onto the image data signal to generate a hybrid image data signal; and an outputting module 44, configured to output the hybrid image data signal to a display screen of a local conference terminal or a conference server such as an MCU which forwards the signal to another conference terminal.

The conference terminal 40 here may be a terminal on a conference site in a videoconference. It may be a conference terminal server which is responsible for managing signals of multiple input devices on the conference site. The input devices may be audio input devices, video input devices, electronic whiteboards or writing screens. This conference site may further include: an image display device (such as an ordinary display) for outputting video signals, and a sound box for outputting audio signals; the image data signal may be a PPT file or a similar file, and the mark data signal may be a circle or a comment. The conference terminal 40 superimposes the mark data signal onto the received image data signal to generate a hybrid image data signal. For example, the hybrid image data signal is a marked slide. Without increasing the complexity of the conference system, the conference terminal enables the participant to mark the slide while watching the slide, thus improving the interactivity between the videoconference users and the discussion efficiency.

Second Embodiment of Conference Terminal

Figure 5:
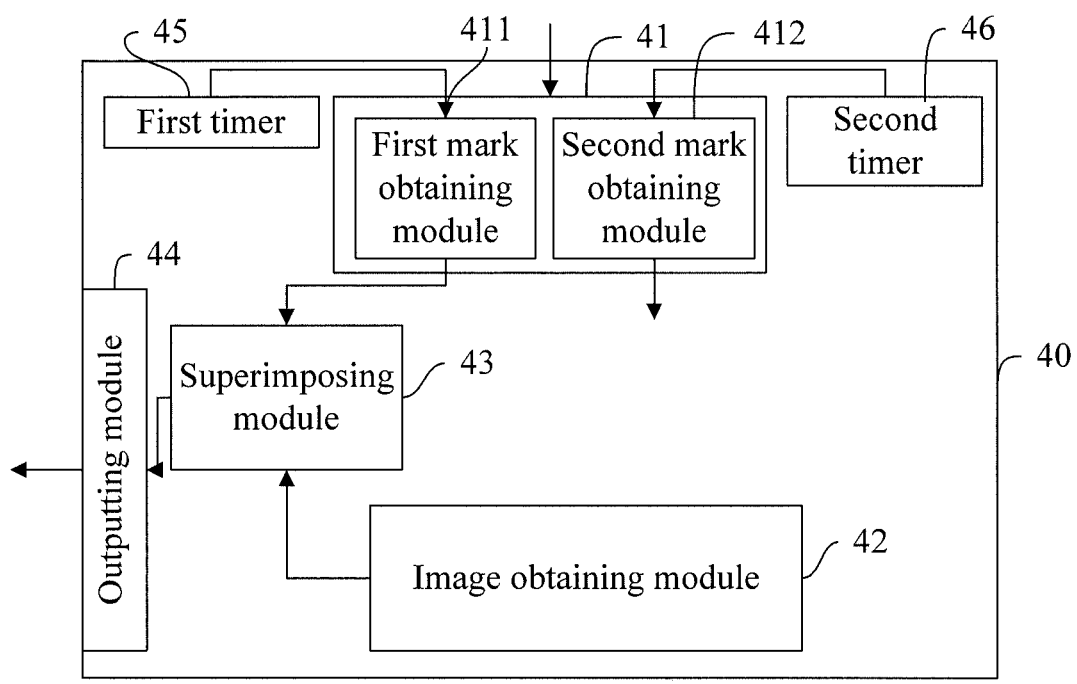
FIG. 5 is a specific schematic diagram of the structure of the conference terminal illustrated in FIG. 4.

As shown in FIG. 5, on the basis of the first embodiment of the conference terminal, the conference terminal 40 may further include: a first timer 45, configured to generate a first time interval value; and a second timer 46, configured to generate a second time interval value. In practice, the two timers may be a same timer, and this timer outputs two time interval values.

Accordingly, the mark obtaining module 41 includes a first mark obtaining module 411 and a second mark obtaining module 412:

The first mark obtaining module 411 is configured to: receive the mark data signal, output the mark data signal according to the first time interval value, and generate a first mark data signal. The first time interval value controls display of the mark data signal on the display screen of the local conference terminal, thus ensuring the real-time display effect of the local display screen. The first time interval value is generally small, that is, the first time interval is generally short. If the display screen of the conference terminal 40 is a TV set, the best value of the first time interval is the same as the frame interval of the TV set.

The second mark obtaining module 412 is configured to: obtain the mark data signal, output the mark data signal according to the second time interval value, and generate a second mark data signal. Because the mark data signal needs to be transmitted in the H.239 auxiliary stream channel when being transmitted to the remote conference terminal, the second time interval value is preferably not too short. The second time interval value may be as great as 1 second so that the size of the transmitted data is reduced.

Third Embodiment of Conference Terminal

Figure 6:
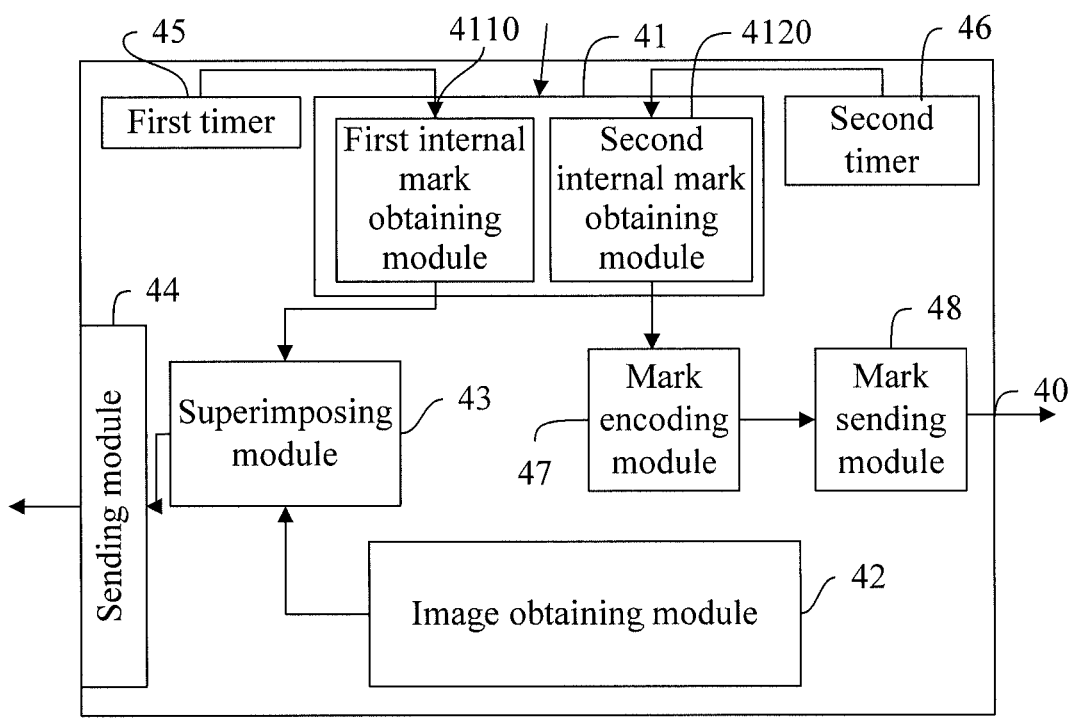
FIG. 6 is a specific schematic structural diagram about how the conference terminal illustrated in FIG. 5 receives a local mark data signal, and superimposes the mark data signal locally to generate hybrid image data.

As shown in FIG. 6, the first mark obtaining module 411 in the second embodiment of the conference terminal may be a first internal mark obtaining module 4110, which is configured to: obtain a mark data signal sent by a local conference terminal, output the mark data signal according to the first time interval value, and generate a first mark data signal. For example, through a touch screen of the local conference terminal, the user adds marks such as circles on the image data signal received by the image obtaining module 42. The image data signal may be a slide, which is a local slide or a slide received from a remote conference terminal. The first internal mark obtaining module 4110 outputs the circle marks according to the first time interval value, and generates a first mark data signal.

Besides, the second mark obtaining module 412 may be a second internal mark obtaining module 4120, which is configured to: receive the mark data signal sent by the local conference terminal, output the mark data signal according to the second time interval value, and generate a second mark data signal.

The conference terminal further includes a mark encoding module 47 and a mark sending module 48. The second mark data signal generated by the second internal mark obtaining module 4110 is transmitted to the mark encoding module 47, and the mark encoding module 47 encodes the second mark data signal to generate a third mark data signal. The third mark data signal is transmitted to the mark sending module 48. The mark sending module 48 sends the third mark data signal to the conference server in the conference system through the H.239 auxiliary stream channel, and the third mark data signal is forwarded by the conference server to another conference terminal.

Fourth Embodiment of Conference Terminal

Figure 7:
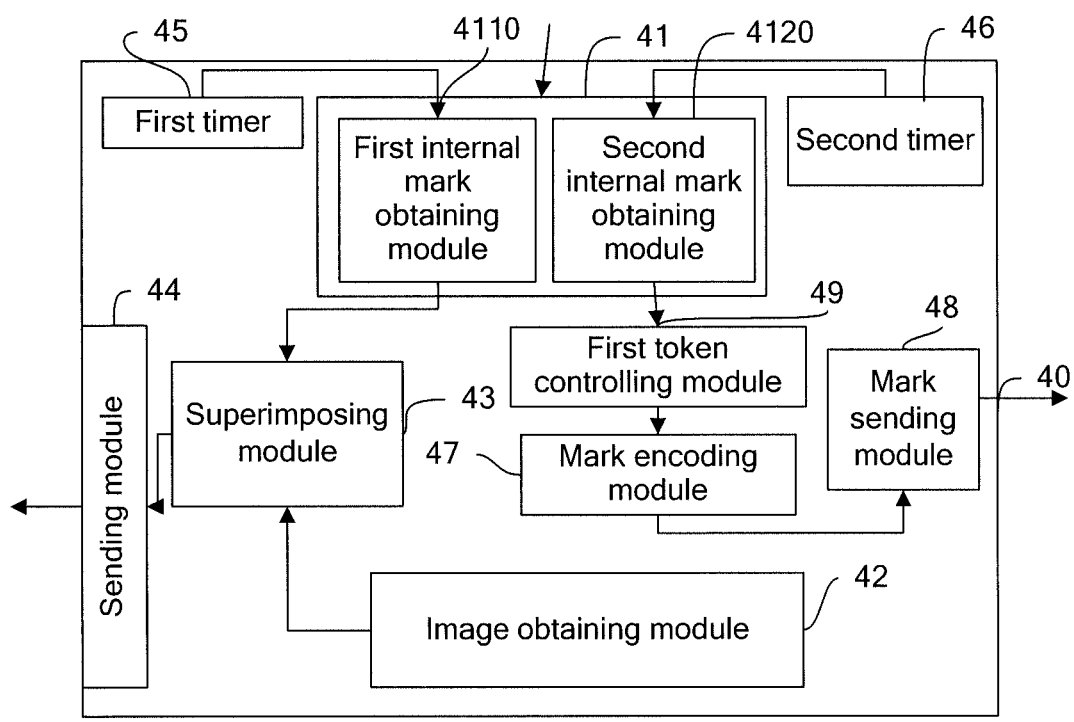
FIG. 7 is a schematic structural diagram about how a first token controlling module applies for a token from an H.239 auxiliary stream channel when the conference terminal illustrated in FIG. 5 sends the local mark data signal, and then records and sends the mark data signal after obtaining the token.

As shown in FIG. 7, in the previous conference terminal embodiment, the data is transmitted through an H.239 auxiliary stream channel or a user-defined channel between the conference terminal and the conference server or another conference terminal, and the mainstream channel of the H.239 protocol is designed to transmit motion videos. In this way, no conflict exists between the transmission of static image data and the transmission of motion videos. However, if the H.239 auxiliary stream channel of the H.239 protocol is used to transmit the mark data signal or the hybrid image data generated by the local conference terminal, the transmission is based on mutual exclusion of the token to prevent confusion of transmission between conference terminals in the conference system. First, a judgment is made to check whether the H.239 auxiliary stream channel supports a mark auxiliary stream. If the H.239 auxiliary stream channel supports a mark auxiliary stream, the conference terminal 40 may further include:

a first token controlling module 49, configured to apply for a conference site token from the H.239 auxiliary stream channel, and generate a first control signal after obtaining the conference site token successfully.

The mark sending module 48 sends a third mark data signal to the conference server through an H.239 auxiliary stream channel according to the first control signal.

That is, before sending a mark data signal, the current conference terminal T1 applies for a token. In this way, the mark data signal of T1 is allowed to be displayed locally and sent to the remote conference server, and is then forwarded by the conference server to another conference terminal. When another conference terminal T2 in the system wants to send its own mark data signal, T2 needs to apply for a token first, and the current token owner changes from conference terminal T1 to conference terminal T2, thus preventing confusion of the mark data signals sent by different conference terminals.

Fifth Embodiment of Conference Terminal

Figure 8:
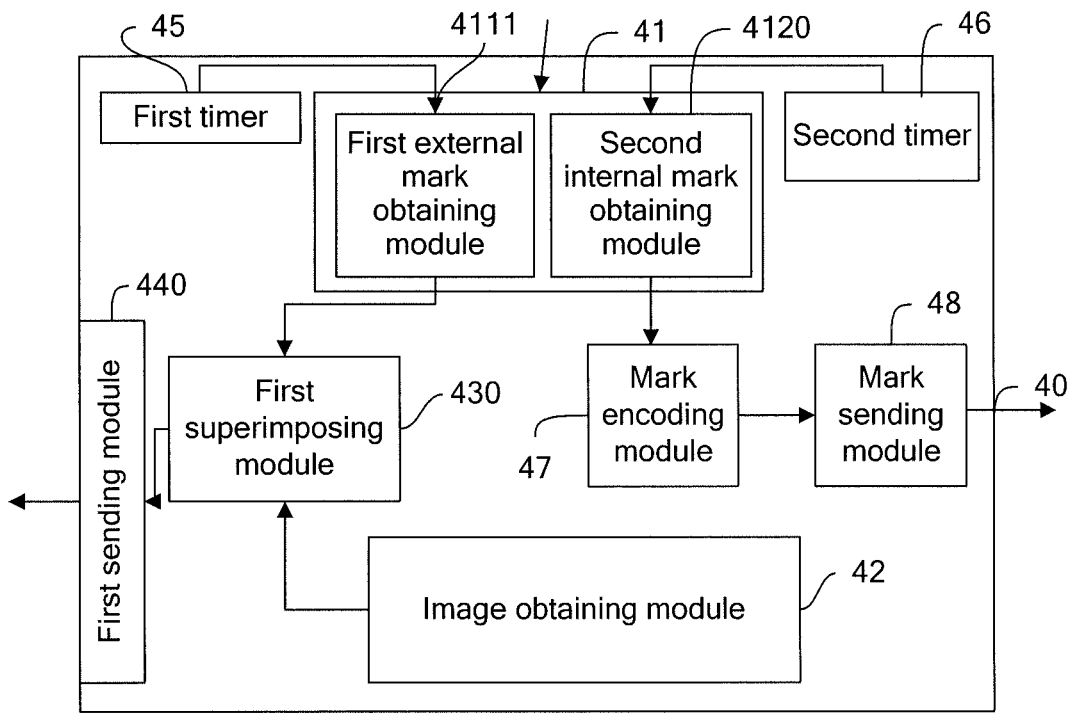
FIG. 8 is a specific schematic structural diagram about how the conference terminal illustrated in FIG. 5 receives an external mark data signal, and superimposes the mark data signal locally to generate hybrid image data.

As shown in FIG. 8, in all the preceding embodiments of the conference terminal, the conference terminals should provide the receiving function. Specifically, the first mark obtaining module 411 is:

a first external mark obtaining module 4111, configured to: receive the mark data signal sent by at least one conference terminal except the local conference terminal and forwarded by the conference server, output the mark data signal according to the first time interval value generated by the first timer 45, and generate a first mark data signal.

The superimposing module 43 is a first superimposing module 430, which is configured to superimpose the first mark data signal onto the image data signal to generate a first hybrid image data signal.

The outputting module 44 is a first sending module 440, which is configured to send the first hybrid image data onto the display screen of the local conference terminal, on which the data is displayed.

Sixth Embodiment of Conference Terminal

Figure 9:
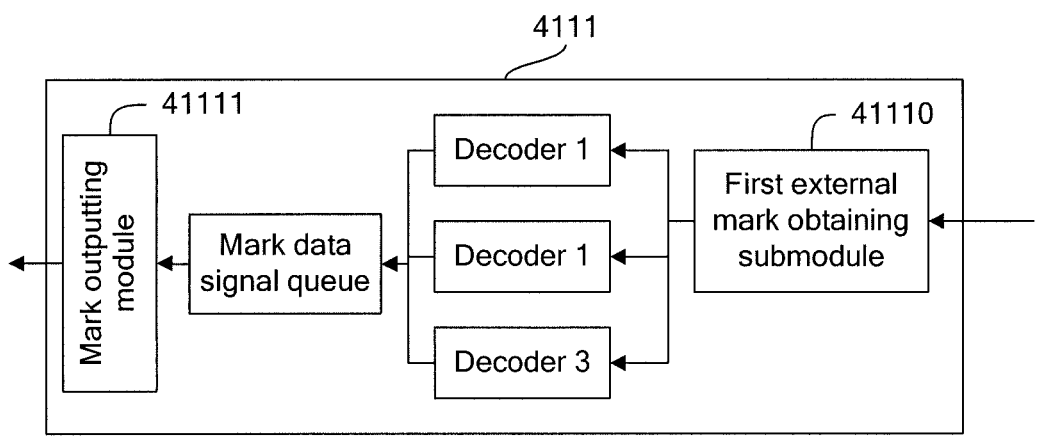
FIG. 9 is a specific schematic diagram of a structure of a first external mark obtaining module illustrated in FIG. 8.

As shown in FIG. 9, it is possible that the conference terminals on multiple conference sites need to make marks simultaneously in a discussion process. Mutual exclusion needs to be performed to prevent disorder of the mark data signals on different conference sites. On the basis of the preceding fifth embodiment of the conference terminal, when the first mark obtaining module 411 receives the mark data signals sent by multiple conference terminals, the first external mark obtaining module 4111 includes:

a first external mark obtaining submodule 41110, configured to receive mark data signals sent by at least one conference terminal except the local conference terminal and forwarded by the conference server;

at least one decoder, for example, decoder 1, decoder 2, and decoder 3, each corresponding to a conference site, where the mark data signal sent by a conference site (namely, another conference terminal) enters a decoder for decoding and each decoder generates a mark data signal queue after decoding the received mark data signal; and a mark outputting module 41111, configured to output the mark data signal according to the first time interval value and the order of the mark data signal queue, and generate at least one first mark data signal.

The first mark data signals are then sent to the first superimposing module 430 sequentially for superimposition. To ensure that the receiver can identify the mark data signal sent by each conference terminal in the superimposition, the mark data signal sent by each conference terminal needs to include the conference number, terminal number, and the corresponding mark data signal content of this conference terminal. The content of the mark data signal may be expressed by a color bitmap such as a vector graph, a binary bitmap, a YUV chromatic bitmap, or a Red, Green and Blue (RGB) chromatic bitmap. If the content of the mark data signal is expressed by a vector graph or a binary bitmap, the conference server (MCU) may allocate a filling color to each conference terminal randomly. The superimposing module of the conference terminal uses the color allocated by the conference server for filling when superimposing the tracks of different conference sites. If the track is expressed by a chromatic bitmap such as YUV or RGB ones, a transparent color needs to be specified in the system uniformly so that the receiver can identify the location of the track and superimpose it onto the slide; in this way, the integrity of the hybrid image data of each conference site is ensured after the mark data signal is superimposed onto the image data signal.

When a conference terminal receives a mark data signal sent by another conference terminal and receives an image data signal at the same time, the conference terminal superimposes the mark data signal onto the received image data signal to form complete hybrid image data. In this way, the conference terminal knows the marks made by the remote party on the current image data.

Seventh Embodiment of Conference Terminal

Figure 10:
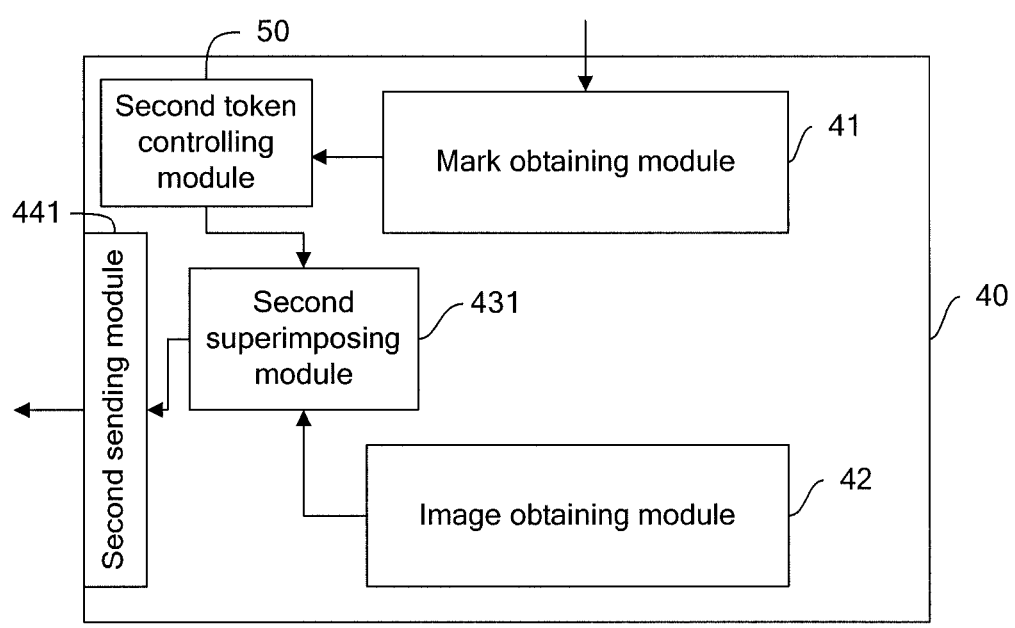
FIG. 10 is a schematic structural diagram about how a second token controlling module applies for a token from an H.239 auxiliary stream channel when the conference terminal illustrated in FIG. 5 performs local superimposition, and then performs superimposition to generate hybrid image data after obtaining the token.

As shown in FIG. 10, when the conference system does not support a mark auxiliary stream, the conference terminal can only send hybrid image data to other terminals. The hybrid image data is generated through superimposition on the local conference terminal. To ensure correct order of the hybrid image data sent by different terminals, the conference terminal 40 may further include: a second token controlling module 50, configured to apply for a conference site token from another H.239 auxiliary stream channel of the H.239 protocol, and generate a second control signal after obtaining the conference site token successfully. After obtaining the second control signal, the superimposing module 43 may start recording the mark data signal and the image data signal, and superimpose the mark data signal onto the image data signal to generate a hybrid image data signal.

That is, before adding a mark onto the received slide, the conference terminal T1 applies for a control token of the H.239 auxiliary stream channel. After obtaining the token, the conference terminal T1 starts recording the mark data signal added by the user, and superimposes the mark data signal onto the slide to generate hybrid image data. The conference terminal T1 sends the encoded hybrid image data to the conference server through the H.239 auxiliary stream channel, and the conference server forwards the hybrid image data to another conference terminal. If a conference terminal in another conference wants to add a mark data signal, the conference terminal takes the same action. In this way, by switching the sending token of the H.239 auxiliary stream channel continuously, the conference terminal of each conference site can add its mark onto the slide.

Accordingly, the superimposing module 43 is specifically a second superimposing module 431, which is configured to superimpose the first mark data signal onto the image data signal to generate second hybrid image data such as a marked slide according to the second control signal generated by the second token controlling module 50.

The outputting module 44 is specifically a second sending module 441, which is configured to send the second hybrid image data onto the display screen of the local conference terminal, or send the second hybrid image data to the conference server through an H.239 auxiliary stream channel. In this way, the second hybrid image data may be displayed on the local conference terminal. After adding a mark onto the touch screen, the user can see the track of the mark which he/she draws in time. Alternatively, the second hybrid image data can be sent to the conference server through the H.239 auxiliary stream channel, and forwarded by the conference server to another conference terminal. In this way, other conference terminals can see the slide currently marked by the user.

Eighth Embodiment of Conference Terminal

Figure 11:
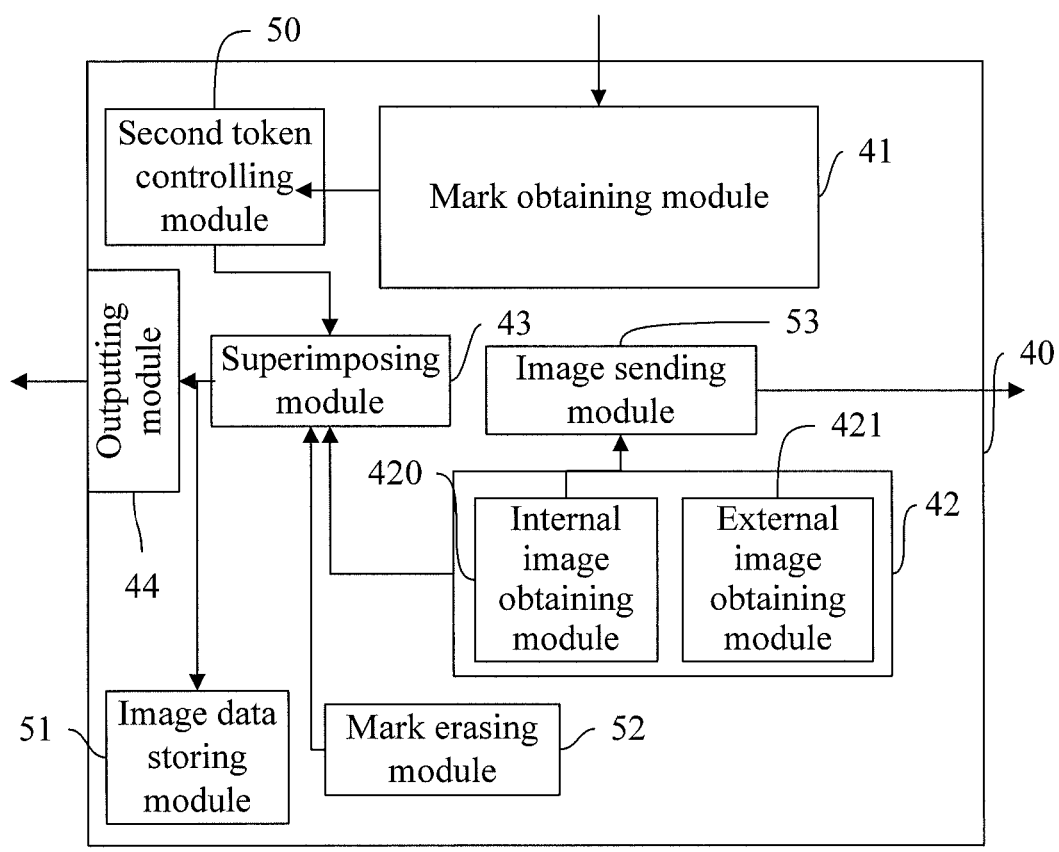
FIG. 11 is a specific schematic diagram of another structure of a conference terminal illustrated in FIG. 1.

As shown in FIG. 11, the conference terminal 40 illustrated in all the preceding embodiments may further include:

an image data storing module 51, configured to store the hybrid image data on the local conference terminal, where, in the process of the conference, each marked slide can be stored on the local conference terminal so that the conference process can be recorded;

a mark erasing module 52, configured to erase the mark data signal in the hybrid image, where, in the process of adding the mark data signal, the user can erase an added mark data signal, and the token owner can send an instruction in token control mode to instruct the superimposing module 43 to erase the added mark; and an image sending module 53, configured to send the image data signal received by the internal image obtaining module 420 from the local conference terminal to the conference server, and the image data signal is forwarded by the conference server to other conference terminals so that other conference terminals can see the image data of the local conference terminal.

Besides, the image obtaining module 42 includes: an internal image obtaining module 420, configured to obtain the image data signal sent by the local conference terminal; and an external image obtaining module 421, configured to obtain the image data signal sent by other conference terminals and forwarded by the conference server.

In all the preceding embodiments, the image data signal received by the image obtaining module 42 may be a slide or a white background. The white background is generated by the input device of the conference terminal. For example, the system generates a white background automatically after the user makes a mark through the touch screen. All mark data signals of the user are superimposed on the white background so that the user can make marks at ease and more conveniently.

Ninth Embodiment of Conference Terminal

Figure 12:
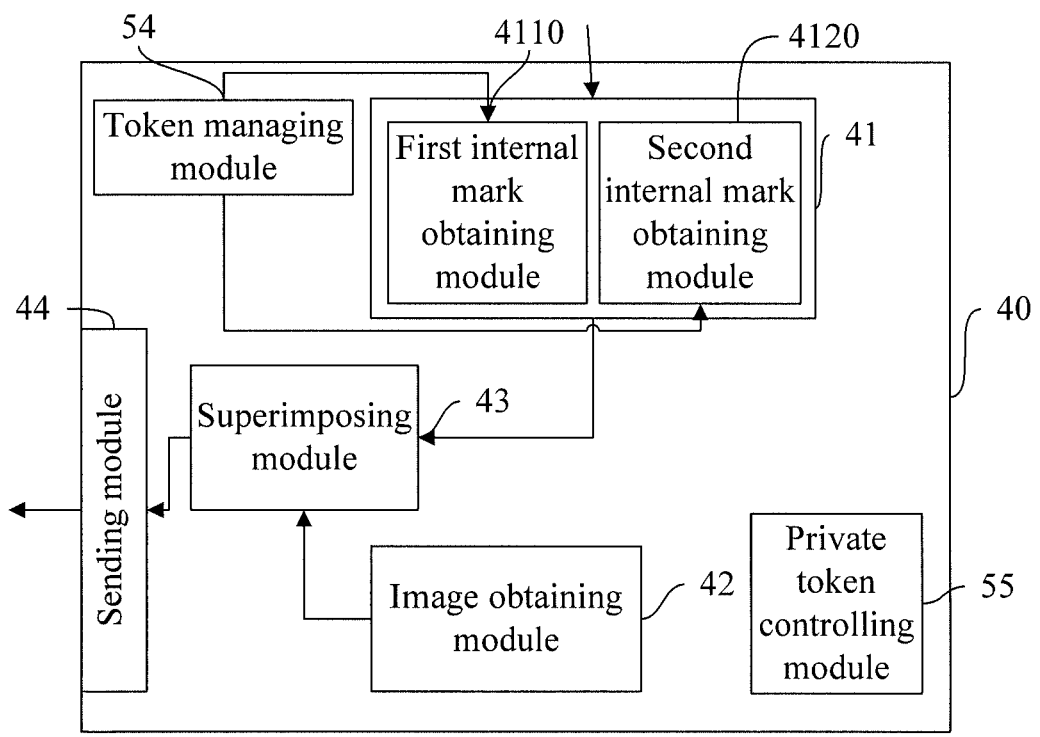
FIG. 12 is a specific schematic diagram of a structure of a conference terminal.

As shown in FIG. 12, in all preceding embodiments, the conference site of the conference terminal 40 may include multiple input devices. The input devices may be audio input devices, video input devices, electronic whiteboards or writing screens. Such input devices can be connected to the conference terminal directly or indirectly. To facilitate switching between different input devices on the conference site of the conference terminal 40, the conference terminal 40 may control multiple input devices on the conference site through mutual exclusion of the token. Therefore, the conference terminal may further include:

a token managing module 54, configured to receive a subtoken application of an input device in the conference site where the local conference terminal is located, and allocate a subtoken to the input device after confirming success of applying for the subtoken.

Therefore, the first internal mark obtaining module 4110 obtains the mark data signal of the input device on the conference site where the local conference terminal is located, outputs the mark data signal according to the first time interval value, and generates a first mark data signal.

The second internal mark obtaining module 4112 obtains the mark data signal of the input device in the conference site where the local conference terminal is located according to the subtoken, outputs the mark data signal according to the second time interval value, and generates a second mark data signal.

That is, no matter which input device among the input devices connected with the conference terminal 40 in the conference site obtains the token, the conference terminal receives the mark data signal of the input device that obtains the token. Nevertheless, for the video/audio signals, the conference terminal may control the signals through mutual exclusion of tokens.

Besides, when an input device on the conference site of the conference terminal 40 needs to perform a private session with a target input device, the conference terminal 40 may further include: a private token controlling module 55, configured to receive a private token application sent by an input device on the conference site where the local conference terminal is located to perform a private conference with a target input device, and use an H.239 auxiliary stream channel or a user-defined channel to allocate a private token to the input device after confirming success of applying for the private token. In this way, the input device can perform a private session with the target input device through the H.239 auxiliary stream channel or the user-defined channel.

The target input device here may be an input device on another conference site except the conference site of the conference terminal 40, or an input device on the conference site of the conference terminal 40.

Besides, the mark obtaining module 41 in the conference terminal 40 may be a real-time mark obtaining module, which can obtain the mark data signal in real time; or may be a manual mark obtaining module, which provides a manual receiving option and obtains the mark data signal when the manual receiving option is selected.

The image obtaining module 42 in the preceding conference terminal 40 may be a real-time image obtaining module, which can obtain the image data signal in real time; or may be a manual image obtaining module, which provides a manual receiving option and obtains the image data signal when the manual receiving option is selected.

Tenth Embodiment of Conference Terminal

Figure 13:
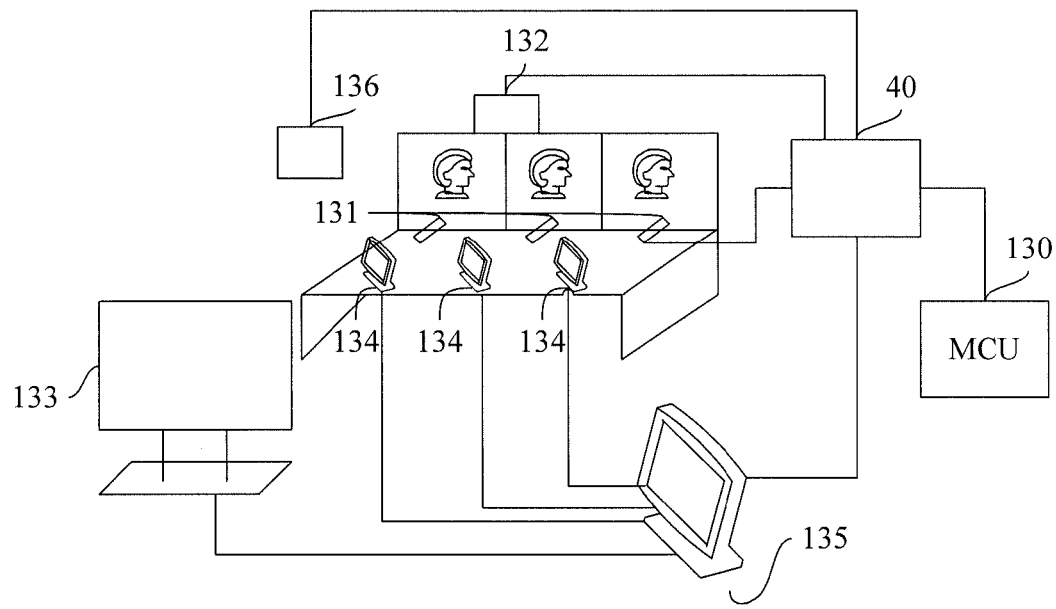
FIG. 13 is a schematic diagram of a specific application scenario of a conference terminal.

The following describes a specific application scenario of the conference site of the conference terminal 40 with reference to FIG. 13. As shown in FIG. 13, the conference terminal 40 is connected with an MCU 130, transmits video and audio signals and data signals (including the traditional data signals and the interactive data signals generated by the interactive electronic whiteboard) on this conference site to the MCU 130 through a network, and receives the video and audio signals and data signals of other conference sites from the MCU 130 so that such signals are transmitted to the output device of this conference site for displaying.

This conference site further includes at least one input device. For video and audio signals, the input devices include:

an audio input device 131, which is generally a microphone for capturing the sound signal on the conference site and transmitting the sound signal to the conference terminal 40; and a video input device 132, which is generally one or more cameras for capturing the video signal on the conference site and transmitting the video signal to the conference terminal 40.

The conference terminal 40 encodes the received video and audio signals and sends them to the MCU 130 through the network, and then the MCU 130 sends the encoded signals on the conference site to other conference sites for displaying.

For data signals:

a data server 135 connected with the conference terminal 40 is deployed on the conference site; as a sender, the user on the conference site edits data on the electronic whiteboard 133 and the writing screen 134, for example, adds a mark data signal, which is sent to the conference terminal 40 through the data server 135; when the signal is sent by the conference terminal 40 to the MCU 130, the MCU 130 distributes the signal to the conference terminals 40 on other conference sites simultaneously.

As a receiver, the conference terminal 40 transmits the data signal received from the MCU 130 to the data server 135 on the conference site, and the data server 135 transmits the data signal to the electronic whiteboard 133 on the conference site and one or more writing screens 134 on the conference site.

The conference site further includes some signal output devices. For video and audio signals, the audio output device 136 serving as a receiver is generally a stereo speaker, which presents the sound signal transmitted by the conference terminal 40 to the participants in the conference site; and the video output device (not illustrated in the figure) is generally one or more display screens or projectors, which present the video signals transmitted by the conference terminal 40 to the participants on the conference site.

In a conference that involves collaboration, one participant needs to change from one role to another, for example, from a speechmaker to a non-speechmaker, or from a non-speechmaker to a speechmaker. In a real-life conference scenario, the role of the speechmaker is switched from one person to another only after the former finishes the operation. Therefore, the embodiments of the present invention provide an operation method as a preferred solution, which uses a control token to switch a role:

(a) A main control token is set for the whole conference system, and the conference system includes at least two conference sites. A conference terminal 40 is set on each conference site. The conference terminal 40 of one conference site is connected to that of another conference site through an MCU 130 to transmit signals. The main control token is equivalent to the foregoing conference site token. When a speechmaker on a conference site succeeds in applying for this conference site token, it means that this conference site is currently ready for making a speech.

If a second speechmaker on conference site 2 requests to obtain the conference site token when the first speechmaker on the current conference site 1 has obtained the conference site token and is making a speech, the second speechmaker changes to the main speechmaker after obtaining the conference site token. The content uttered by the main speechmaker is sent to other terminals on this conference site or the conference terminals in other conference sites.

Corresponding to this scenario, each man-machine interactive device (electronic whiteboard or writing screen) can submit a control token application. The device can apply for the token actively, or transfer the control token to the interactive conference terminals of this conference site or other conference sites actively.

(b) A hierarchy of control tokens is set. That is, a main control token at the conference system level (equivalent to the foregoing conference site token) is set, and each participant on the conference site corresponds to a subtoken. This method is put forward in view of the following application scenario:

First, a solution is generated on the local conference site. After a consensus is reached throughout the conference site, the final solution is distributed to other conference sites. The following two scenarios exist:

Scenario 1: The first speechmaker and the second speechmaker are in the same conference site, and the first speechmaker is making a speech. In this scenario, after obtaining the subtoken of this conference site, the second speechmaker can change to the main speechmaker. The first speechmaker can also transfer the subtoken to the second speechmaker on the local conference site actively.

Scenario 2: The first speechmaker and the second speechmaker are on different conference sites, and the first speechmaker is making a speech. In this scenario, after submitting an application for the token, the second speechmaker applies for the token of the conference site of the second speechmaker first. After the application succeeds, the second speechmaker applies for the subtoken within the conference site. After obtaining the subtoken, the second speechmaker changes to the main speechmaker. The first speechmaker can also transfer the conference site token to the conference site of the second speechmaker actively, and the conference site of the second speechmaker distributes the local subtoken to the second speechmaker.

A special application scenario exists: First, a solution is generated on the local conference site; after a consensus is reached throughout the conference site, the final solution is distributed to other conference sites. In this scenario, before a consensus is reached throughout this conference site and the transmission function is enabled, the data server 135 on this conference site does not send the unfinished mark information to the conference terminal 40, but sends such information to other participants of this conference site. After the transmission function is enabled, the conference terminal 40 transmits the obtained mark signal to the MCU 130, and the MCU 130 transmits it to other conference sites.

In this embodiment, the data is transmitted between the conference terminal 40 and the MCU 130 through the H.239 protocol. The H.239 protocol provides a control channel, a mainstream channel and an H.239 auxiliary stream channel. The mainstream channel transmits video signals between conference sites, and the H.239 auxiliary stream channel transmits data signals such as PPT files, Word files, or marks. At the time of transmitting the data signals, the transmission method is the same as the method provided in the preceding first to tenth embodiments of the conference terminal 40, as exemplified below:

(a) The comment information is superimposed onto a PPT file for encoding together, and the encoded information is transmitted in the same channel.

(b) The PPT data and the comment information are encoded separately, and transmitted in different channels. Another appropriate practice is: Different marks are affixed to the encoded PPT data and comment information respectively, and the PPT data and the comment information are transmitted in the same channel.

(c) The speechmaker generally requires many tools such as different colors to demonstrate ideas more accurately. Different operations on the electronic whiteboard are reflected on the display devices on other conference sites in real time.

When the conference terminal 40 on each conference site receives the video and audio signals or data signals from the MCU 130, the application scenarios of real-time receiving or manual receiving are as follows:

(1) If a writing screen 134 is used, and the conference site serving as a sender transmits the data signals such as comments in real time or through manual operations: The person who uses the writing screen 134 is a speechmaker. While lecturing, the speechmaker makes marks on the PPT slide, for example, draws a straight line. At regular intervals, the images generated by the actions of the speechmaker are sent to the data server 135, or the speechmaker starts the transmission function manually, and the data server 135 sends the images to the electronic whiteboard 133 and other writing screens on the local conference site and to the conference terminal 40. The conference terminal 40 sends the images to the MCU 130, and the MCU 130 forwards the images to the conference terminals 40 on other conference sites.

The conference terminal 40 of the conference site serving as a receiving party can receive the data signals forwarded by the MCU 130 in real time or manually.

(2) If an electronic whiteboard is used, and the comments are transmitted in real time or through manual operations: The person who uses the electronic whiteboard 133 is a speechmaker. While lecturing, the speechmaker makes marks on the PPT slide, for example, draws a straight line. At regular intervals, the images generated by the actions of the speechmaker are sent to the data server 135, or the speechmaker starts the transmission function manually, and the data server 135 sends the images to the writing screen 134 on the local conference site and the conference terminal 40. The conference terminal 40 sends the images to the MCU 130, and the MCU 130 forwards the images to the conference terminals 40 on other conference sites.

The conference terminal 40 of the conference site serving as a receiver can receive the data signals forwarded by the MCU 130 in real time or manually.

(3) In the foregoing scenarios, other participants corresponding to the electronic whiteboard and the writing screen used by the non-speechmaker may need to make comments on the lecture, and can make their comments on the receiving screen.

Because the lecturing speed of the speechmaker is not always consistent with the speed of commenting by other participants, the following two scenarios are possible:

The first page that other participants are commenting on is the same as the second page under lecturing by the speechmaker.

The first page that other participants are commenting on is different from the second page under lecturing by the speechmaker.

A solution is: A mode switch is offered to the receiving terminals of other participants. If passive receiving is expected, the running mode is switched to the real-time update mode. In real-time update mode, the content displayed by the receiving terminal changes with the lecturing content of the speechmaker, and other participants are unable to make comments during the lecturing. To enable commenting, the mode needs to be switched to the comment holding mode. In comment holding mode, the content displayed by this terminal does not change with the lecturing content of the speechmaker, and other participants can make comments during the lecturing. After completion of the commenting, the mode is switched to the update mode.

(4) In scenarios 1-2, the comment maker may expect to save the comments or the transmitted pages anytime with a view to summarizing or reviewing after the conference. A simple method is: The comment maker saves the current comment into the data server 135 on the local conference site after the saving function is enabled on the electronic whiteboard or writing screen operated by the comment maker.

(5) Sometimes two participants need to talk privately during the conference. In this case, an H.239 auxiliary stream channel needs to be started for the participants who require private communications. A private token is created in the H.239 auxiliary stream. After the two private talkers obtain the private token, private talker 1 sends a comment to private talker 2; after receiving the comment sent by private talker 1, private talker 2 sends comment information to private talker 1, thus exchanging the private information.

Figure 14:
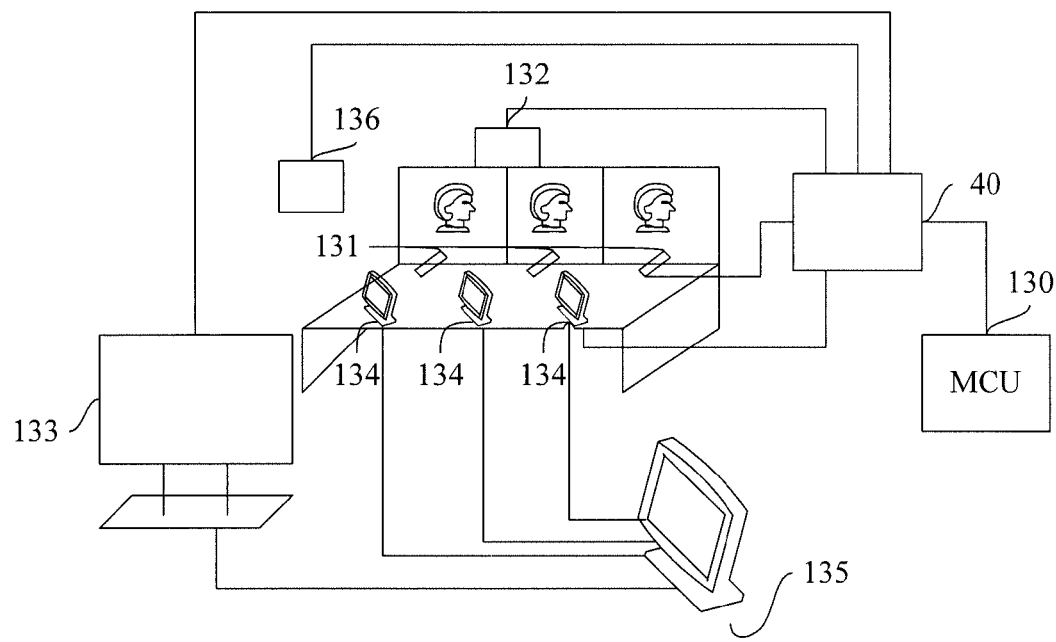
FIG. 14 is a schematic diagram of another specific application scenario of a conference terminal.

FIG. 14 is a derivative of FIG. 13. In FIG. 14, the electronic whiteboard 133 and the writing screen 134 are directly connected with the conference terminal 40 on the conference site, and the data server 135 is only configured to store the traditional data such as the PPT slide for lecturing or comment information.

Figure 15:
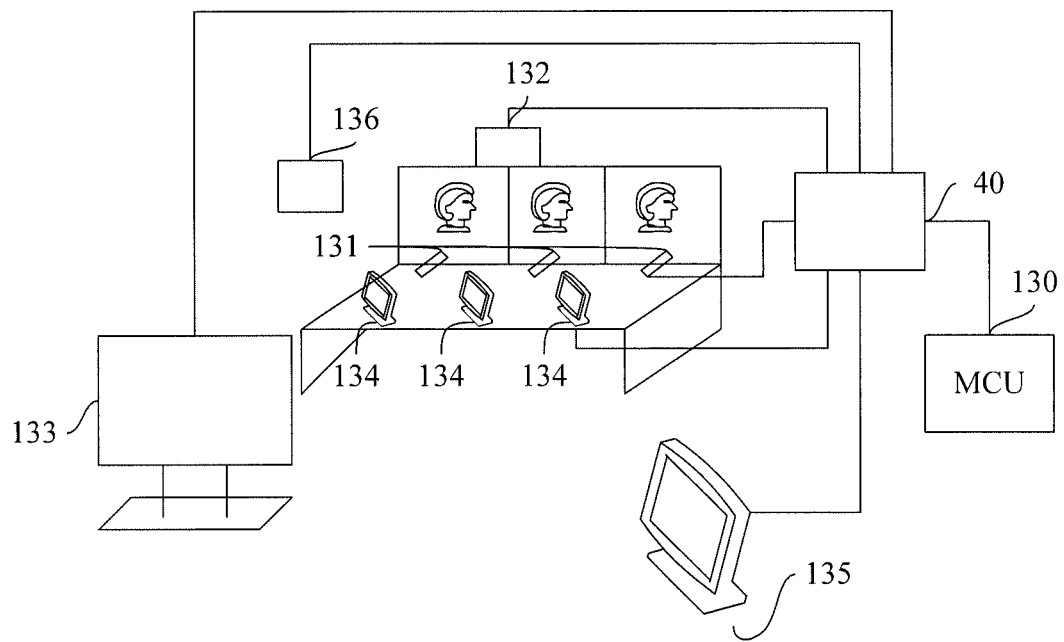
FIG. 15 is a schematic diagram of another specific application scenario of a conference terminal.

FIG. 15 is another derivative of FIG. 13. In FIG. 15, the conference terminal 40 is a center, and the electronic whiteboard 133 and the writing screen 134 are only connected with the conference terminal 40 on the conference site; the data server 135 is connected with the conference terminal 40; and the data server 135 is only a storage device for storing the data demonstrated on the electronic whiteboard 133, or the traditional data such as the PPT slide under lecturing, or the comment information.

The conference terminal 40 may include a storing module for storing data signals in place of the data server 135. Specially, the input device such as the electronic whiteboard 133 may also be capable of storing the data signals generated by the electronic whiteboard itself, or the data signals sent by other participants and forwarded by the conference terminal.

In the preceding embodiments of the conference terminal, without involving any extra device, the data collaboration between participants is implemented on the basis of the existing dual-stream function of the H.239 protocol, and dynamic interactions are implemented between any input source (such as an electronic whiteboard and a writing screen) on the conference site and an input source on other conference sites, thus improving interactivity between the users and the discussion efficiency.

First Embodiment of Conference Server

Figure 16:
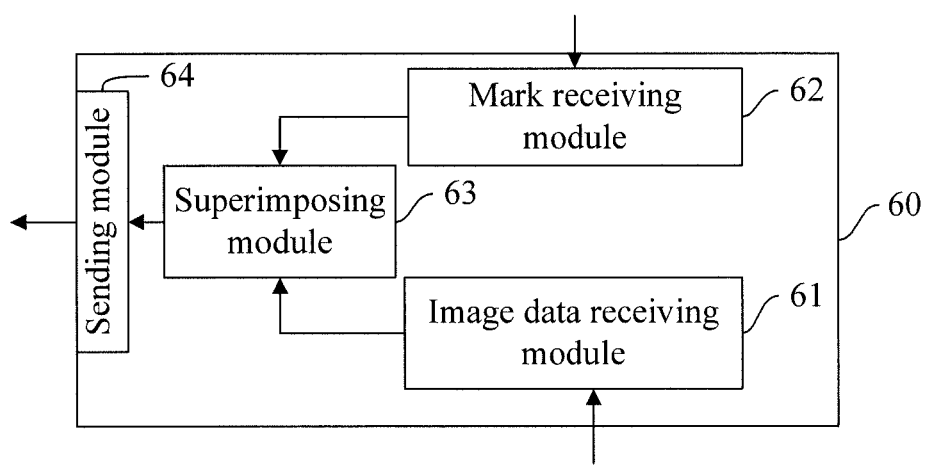
FIG. 16 is a schematic diagram of a structure of a conference server according to an embodiment of the present invention.

As shown in FIG. 16, a conference server 60 is provided in an embodiment of the present invention. The conference server is generally an MCU, which is applied in a videoconference and provides data forwarding and services for each conference terminal in the videoconference. The conference server 60 includes:

an image data receiving module 61, configured to receive an image data signal sent by a conference terminal;

a mark receiving module 62, configured to receive a mark data signal sent by the conference terminal;

a superimposing module 63, configured to superimpose the mark data signal onto the image data signal to generate hybrid image data; and a sending module 64, configured to send the hybrid image data, or the image data signal, or the mark data signal to the conference terminal.

Second Embodiment of Conference Server

Figure 17:
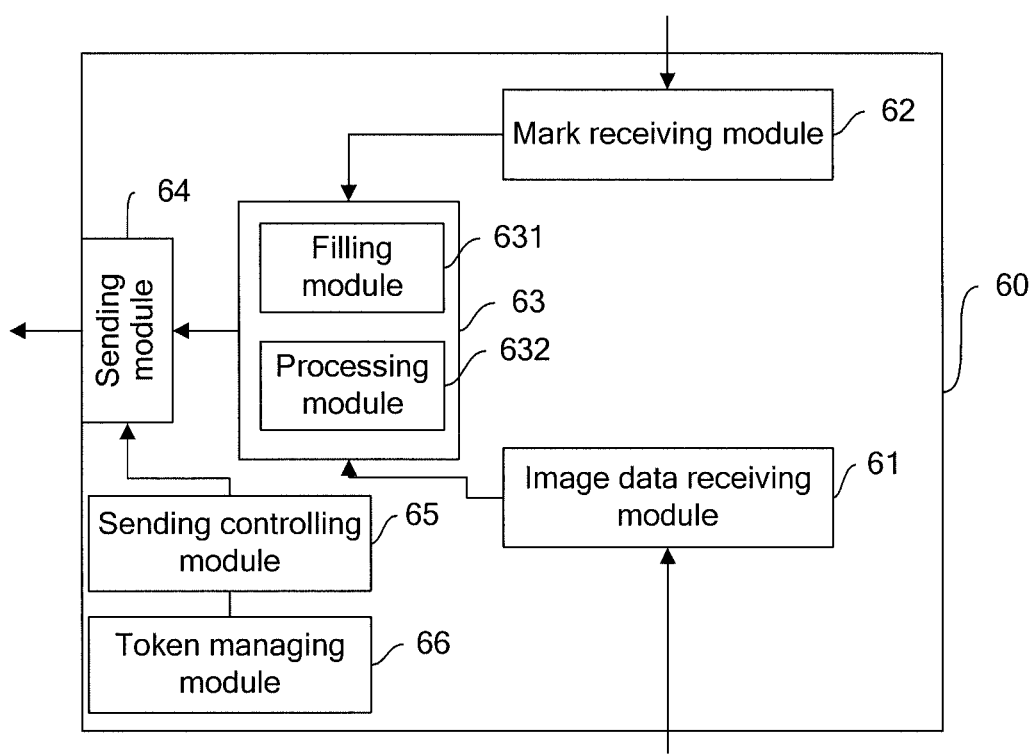
FIG. 17 is a specific schematic diagram of a structure of the conference server illustrated in FIG. 16.

As shown in FIG. 17, when the superimposing module 63 superimposes the mark data signal onto the image data signal, the mark data signals sent by multiple conference terminals may be received, and the superimposing module 63 needs to discriminate the mark data signal sent by one conference terminal from the mark data signal sent by another conference terminal. The superimposing module 63 includes a filling module 631 and a processing module 632.

The filling module 631 is configured to allocate a filler color or a transparent color to the mark data signal, and use the filling color or transparent color to process the mark data signal and generate a chromatic mark data signal. The content of the mark data signal may be expressed by a color bitmap such as a vector graph, a binary bitmap, a YUV chromatic bitmap, or an RGB chromatic bitmap. If the content of the mark data signal is expressed by a vector graph or a binary bitmap, the filling module may allocate a filling color to the mark data signal of each conference terminal randomly. The superimposing module 63 uses the filling color for filling when superimposing the tracks of different conference sites. If the content of the mark data signal is expressed by a color bitmap such as YUV or RGB, the MCU needs to specify a transparent color so that the receiving conference terminal can identify the location of the track correctly. In this way, the integrity of the hybrid image data of each conference site is ensured after the mark data signal is superimposed onto the image data signal.

The processing module 632 is configured to superimpose the color mark data signal onto the image data signal to generate hybrid image data.

When sending the hybrid image data or the mark data signal to the conference terminal, the conference server 60 may further include: a sending controlling module 65, which is configured to select an H.239 auxiliary stream channel, and control the sending module 64 to send the hybrid image data or the mark data signal to the conference terminal through the H.239 auxiliary stream channel.

In practice, the conference server 60 may further include: a token managing module 66, which is configured to receive a conference site token application sent by the conference terminal, and return a conference site token to the conference terminal after confirming success of applying for the conference site token. The sending controlling module 65 selects an H.239 auxiliary stream channel according to the conference site token, and controls the sending module 64 to send the hybrid image data or the mark data signal to the conference terminal through the H.239 auxiliary stream channel.

When multiple conference servers exist in the system, the conference server may forward the superimposed hybrid image data, or the mark data signal sent by the conference terminal or the image data signal sent by the conference terminal to other conference servers, and other conference servers send such signals to the conference terminals connected with the conference servers.

When the conference terminal provides no superimposition function, the conference server 60 superimposes the mark data signal onto the image data signal (such as a slide) sent by each conference terminal, and then forwards the signal to other conference terminals. In this way, each conference terminal in the conference system can see the marks added by other conference terminals, collaboration between the participants is implemented, and the user interactivity and the discussion efficiency are improved.

Embodiments of Conference System

The conference system including the foregoing conference terminals and the foregoing conference server is described below:

The foregoing conference terminals and the foregoing conference server may make up the following three application scenarios:

(1) Conference terminal 1 sends the shared image data signal to the conference server, and conference terminal 2 sends the local mark data signal to the conference server. The conference server superimposes the mark data signal onto the image data signal to generate hybrid image data, and sends the hybrid image data to all conference terminals. After receiving the hybrid image data, the conference terminal decodes and displays the hybrid image data.

(2) Conference terminal 1 sends the shared image data signal to the conference server, and conference terminal 2 sends the local mark data signal to the conference server. The conference server forwards such signals to all conference terminals. After receiving the signals, the conference terminal superimposes the mark data signal onto the image data signal, and displays the superimposed signal.

(3) Conference terminal 1 superimposes the local mark data signal onto the shared image data signal (local image data or image data received from the remote side) to generate hybrid image data, and sends the hybrid image data to the conference server through an H.239 auxiliary stream channel. The conference server forwards the hybrid image data to other conference terminals 2. After receiving the hybrid image data, other conference terminals 2 decode and display the hybrid image data.

In all the preceding application scenarios, all conference terminals are functionally equal. Conference terminal 1 is capable of local superimposition, so is conference terminal 2; conference terminal 1 is capable of sending local image data and the mark data signal, so is conference terminal 2.

First Embodiment of Conference System

Figure 18:
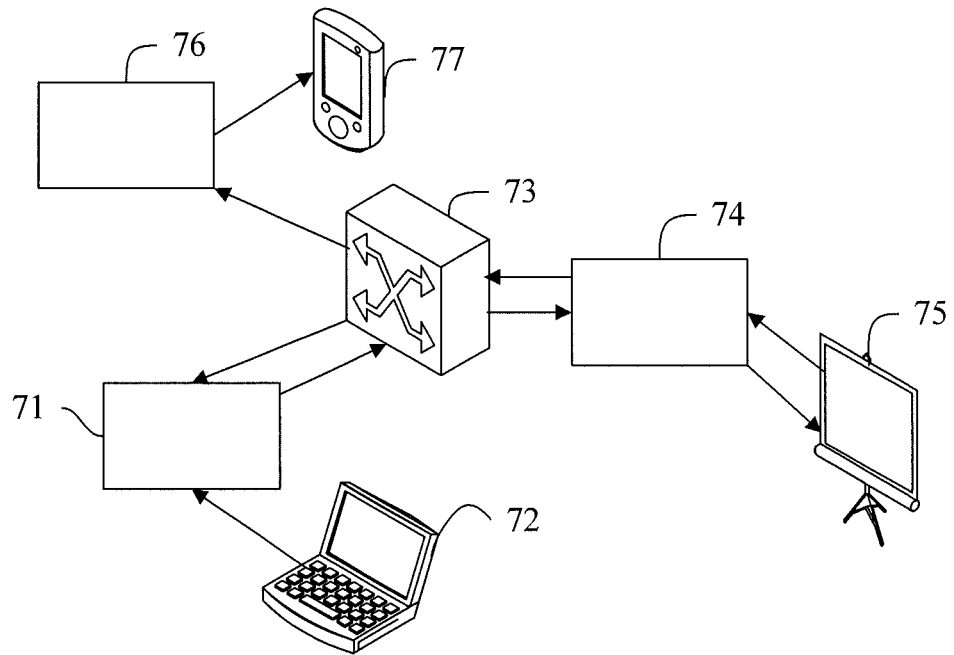
FIG. 18 is a schematic diagram of a structure of a conference system according to an embodiment of the present invention.

FIG. 18 is a schematic structural diagram of a conference system according to the first application scenario mentioned above. The conference system includes: a conference terminal 71 and a notebook computer 72 connected with the conference terminal 71; a conference server 73; a conference terminal 74 and a display 75 with a touch screen, where the display 75 is connected with the conference terminal 74; a conference terminal 76, and an ordinary display 77 connected with the conference terminal 76. The number of conference terminals is not limited. Each conference terminal represents a conference site. The conference terminal 71 includes:

an image sending module 53, configured to send an image data signal to the conference server 73.

The conference terminal 74 includes:

a mark sending module 48, configured to send a mark data signal to the conference server 73.

Like the conference server 60 described above, the conference server 73 includes:

an image data receiving module 61, configured to receive the image data signal sent by the image sending module 53;

a mark receiving module 62, configured to receive the mark data signal sent by the mark sending module 48;

a superimposing module 63, configured to superimpose the mark data signal onto the image data signal to generate hybrid image data; and a sending module 64, configured to send the hybrid image data to the conference terminal 71, the conference terminal 74, and the conference terminal 76.

The conference terminal 71 and the conference terminal 76 are configured to receive and display the hybrid image data.

Specifically, this application scenario includes the following procedure:

(1) The conference terminal 71 is a conference site that needs to share a slide with other participants. The user only needs to connect a notebook computer to the conference terminal 71 through an ordinary Video Graphics Array (VGA) cable, and sends the slide to the conference server 73 through an H.239 auxiliary stream channel. The conference server 73 sends the slide to the conference terminal 74 and the conference terminal 76.

(2) The conference terminal 74 is a conference site with a touch screen display 75. In the process of watching the slide, the user of the conference site has a question and needs to discuss with others. Therefore, the user circles the place to be discussed on the display 75. The circle is recorded by the touch screen on the display, and transmitted to the conference server 73 through the conference terminal 74. Besides, if the conference server 73 does not have the slide which is watched by the user of the conference terminal 74, the conference terminal 74 needs to send the slide to the conference server 73.

(3) After receiving the circle mark sent by the conference terminal 74, the conference server 73 decodes the video stream of the slide to obtain the slide image, and then superimposes the circle mark sent by the conference terminal 72 onto the slide image; encodes the hybrid image with the superimposed circle mark; and sends the encoded hybrid image stream to all conference sites through the H.239 auxiliary stream channel.

(4) The conference terminal 76 is an ordinary conference site connected with an ordinary display 77. The conference site receives the hybrid video stream sent by the conference server 73 through the H.239 auxiliary stream channel. After being decoded, the slide image with the superimposed circle mark sent by the conference terminal 74 can be seen.

Likewise, the conference terminal 71 and all other conference sites receive the slide image which is the same as that received by the conference terminal 76. If another conference site also has a mark input device like the conference terminal 74, this conference site can also send its mark which can be seen by all conference sites.

Second Embodiment of Conference System

Figure 19:
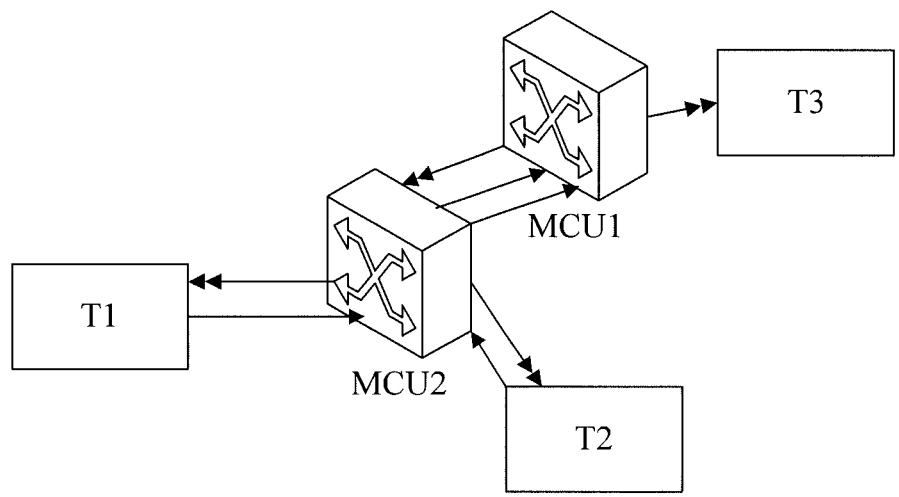
FIG. 19 is a schematic diagram of an application scenario of multiple MCUs concatenated in the conference system illustrated in FIG. 18.

FIG. 19 shows an application scenario with multiple concatenated conference servers in a conference system on the basis of the first embodiment of the conference system above. In FIG. 19, the double-headed arrow represents transmission of hybrid image data streams.

When multiple conference servers exist in the system, the multiple conference servers are concatenated with each other. Each conference server can be connected with one or more conference terminals. One of the conference servers is a master conference server, and other conference servers are slave conference servers. The master conference server is responsible for superimposing the added mark data signal onto the shared image data signal sent by the conference terminal.

In this embodiment, it is assumed that two MCUs (conference servers) are concatenated. The system includes: MCU1, MCU2, conference terminal T1, conference terminal T2, and conference terminal T3. The MCU1 is a master MCU, and the MCU2 is a slave MCU. If more than two MCUs are concatenated, one of the MCUs is a master MCU, and other MCUs are slave MCUs.

In the conference, the conference terminal T1 sends the shared image data signal to the connected MCU2, and the conference terminal T2 sends its mark data signal to the connected MCU2. The slave MCU2 forwards the shared image data signal of T1 and the mark data signal of T2 to the master MCU (namely, MCU1) in the conference system. The master MCU (MCU1) in the conference system superimposes the mark data signal onto the image data signal, and compresses the signal to generate hybrid image data, which is forwarded to all conference terminals in the conference system. For the conference terminal connected to the slave MCU (MCU1), the hybrid image data is sent by the master MCU to each slave MCU in the conference, and then forwarded by the slave MCU. After receiving the hybrid image data, each terminal in the conference system decodes the hybrid image data and displays it.

If more MCUs are concatenated, the operation is similar: The master MCU in the concatenated conference system is responsible for superimposing the mark data signal onto the image data signal in the conference.

In the scenario described above, multiple MCUs are concatenated in the system, where one of the MCUs is a master MCU and other MCUs are slave MCUs. In practice, it is possible that multiple MCUs in the system are master MCUs. That is, each MCU is responsible for superimposition and forwarding. To implement coordination between multiple MCUs, the system may further include a controlling unit, which is configured to obtain the sending time of the mark data signal, and generate a control signal according to the order of the sending time of the mark data signal.

The superimposing module in the at least two master conference servers superimposes the mark data signal onto the image data signal according to the control signal to generate the hybrid image data, and sends the hybrid image data signal to each conference terminal in the system. The controlling unit may be a gatekeeper in the system. The gatekeeper is a switching server based on softswitch, and is responsible for signal switching and control on a Voice over Internet Protocol (VoIP) network. The controlling unit may also be another controlling module of similar functions.

The token control mode may be used in place of the gatekeeper to control the coordination between the conference servers. In the system, the time of each conference terminal sending the mark data signal is notified to each master conference server. The master conference server obtains a control token actively according to the sending time of the mark signal. After this master conference server finishes the superimposition, the next master conference server obtains the control token according to the time order of all the conference terminals sending the mark data signal, and goes on with the superimposition until the last master conference server finishes superimposition. The last master conference server sends the final hybrid image data signal to the each conference terminal in the system. Each master conference server obtains the control token actively, or the gatekeeper allocates the control token to each master conference server.

Third Embodiment of Conference System

Figure 20:
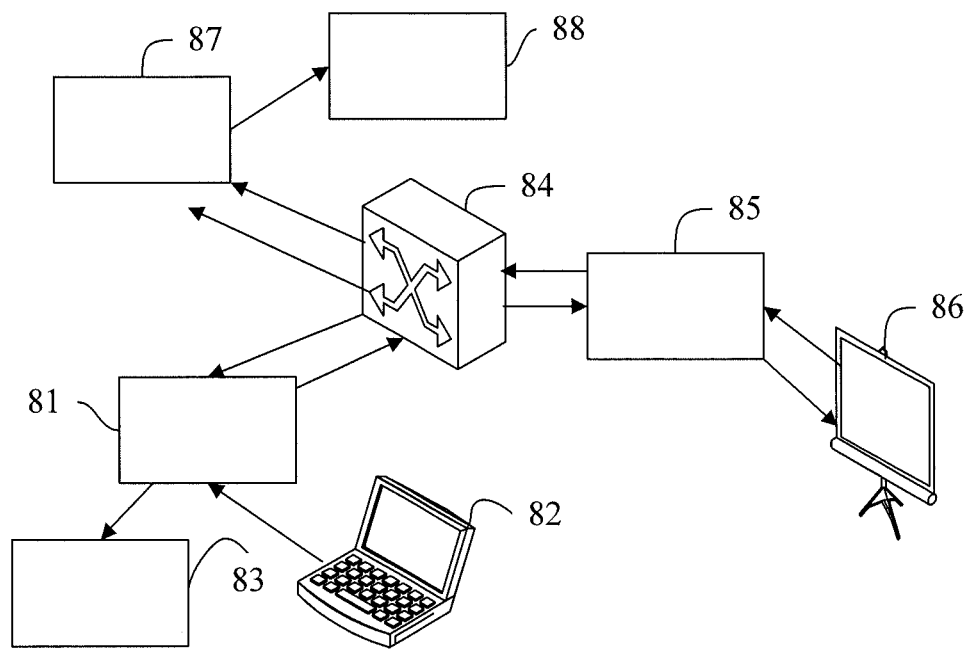
FIG. 20 is a schematic diagram of another structure of a conference system according to an embodiment of the present invention.

FIG. 20 is schematic diagram of a structure of a conference system in the second application scenario mentioned above. The conference system includes: a conference terminal 81, and a notebook computer 82 and an ordinary display 83 both connected with the conference terminal 81; a conference server 84; a conference terminal 85, and a display 86 with a touch screen, where the display 86 is connected with the conference terminal 85; a conference terminal 87, and an ordinary display 88 connected with the conference terminal 87. Each conference terminal represents a conference site. The number of conference terminals is not limited. The conference terminal 81 includes:

an image sending module 53, configured to send an image data signal to the conference server 83.

The conference terminal 85 includes:

a mark sending module 48, configured to send a mark data signal to the conference server 83.

The conference server 83 forwards the received image data signal and the mark data signal to the conference terminal 87 and the conference terminal 81.

The conference terminal 87 and the conference terminal 81 both include:

a first timer 45, configured to generate a first time interval value;

an image obtaining module 42, configured to receive the image data signal forwarded by the conference server;

a first external mark obtaining module 4111, configured to: receive the mark data signal forwarded by the conference server 83, output the mark data signal according to the first time interval value, and generate a first mark data signal;

a second superimposing module 431, configured to superimpose the first mark data signal onto the image data signal to generate a second hybrid image data signal; and a displaying module such as a display 88, configured to display the second hybrid image data signal.

In the case that the conference terminal 87 receives the mark data signals from multiple conference terminals, to ensure that the receiver can identify the mark data signal sent by each conference terminal in the superimposition, the mark data signal sent by each conference terminal needs to include the conference number, terminal number, and the corresponding mark data signal content of this conference terminal. The content of the mark data signal may be expressed by a color bitmap such as a vector graph, a binary bitmap, a YUV color bitmap, or an RGB color bitmap. If the content of the mark data signal is expressed by a vector graph or binary bitmap, the conference server may allocate a filler color to each conference terminal randomly. The superimposing module of the conference terminal uses the color allocated by the conference server for filling when superimposing the tracks of different conference sites. If the track is expressed by a color bitmap such as YUV or RGB, a transparent color needs to be specified in the system uniformly so that the receiver can identify the location of the track and superimpose it onto the slide. Specifically, the first external mark obtaining module 4111 includes:

a first external mark obtaining submodule 41110, configured to: receive the mark data signals sent by at least one conference terminal except the local conference terminal and forwarded by the conference server, find the corresponding decoder according to the information such as the conference number and terminal number in the mark data signals, and send the mark data signal corresponding to the decoder;

at least one decoder, configured to decode the mark data signals of the at least one conference terminal respectively, and generate a mark data signal queue; and a mark outputting module 41111, configured to output the mark data signal according to the first time interval value and the order of the mark data signal queue, and generate at least one first mark data signal.

The application scenario includes the following procedure:

(1) The conference terminal 81 is a conference site that needs to share a slide with other participants. The user only needs to connect a notebook computer to the first conference terminal 81 (usually through a VGA cable at present), and sends the slide to all participants through an H.239 auxiliary stream channel.

(2) The conference terminal 85 is a conference site with a touch screen display 86. In the process of watching the slide, the user of the conference site has a question and needs to discuss with others. Therefore, the user circles the place to be discussed on the display 75. The circle is recorded by the touch screen on the display, and transmitted to the conference server 84 through the conference terminal 85.

(3) The conference server 84 forwards the circle mark sent by the conference terminal 85 to the conference terminal 87 and the conference terminal 81.

(4) The conference terminal 87 is an ordinary conference site, which receives the slide code stream from the conference terminal 81 and the circle mark from the conference terminal 85 simultaneously. The conference terminal 87 decodes the slide code stream to obtain a slide image, and superimposes the circle mark onto the slide image. In this way, the slide image with the superimposed circle mark is seen.

If another conference site also has a mark input device like the conference terminal 85, this conference site can also send its mark which can be seen by all conference sites.

Fourth Embodiment of Conference System

Figure 21:
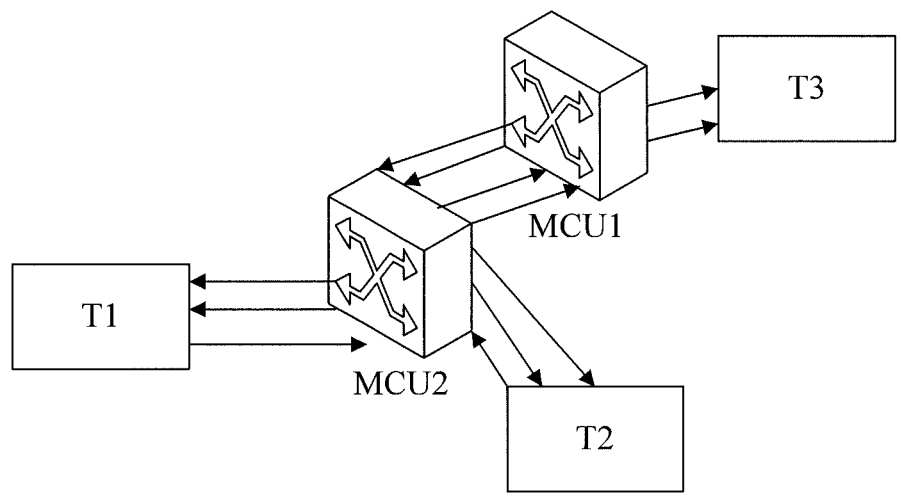
FIG. 21 is a schematic diagram of an application scenario of multiple MCUs concatenated in the conference system illustrated in FIG. 20.

FIG. 21 shows an application scenario with multiple concatenated conference servers in a conference system on the basis of the preceding third embodiment of the conference system. In FIG. 21, the double-headed arrow represents transmission of hybrid image data streams.

It is assumed that two MCUs are concatenated in the system, where MCU1 is a master MCU, and MCU2 is a slave MCU. If more than two MCUs are concatenated, the scenario is similar. That is, one of the MCUs is a master MCU, and other MCUs are slave MCUs.

In the conference system, the conference terminal T1 sends the shared image data signal to the connected MCU2, and the conference terminal T2 sends the local mark data signal to the connected MCU2. The slave MCU2 forwards the shared image data signal of T1 and the mark data signal of T2 to the master MCU (namely, MCU1) in the conference system. The master MCU in the conference system forwards the received shared image data signal and mark data signal to each conference terminal in the conference system. For the conference terminal connected to the slave MCU, the shared image data signal and the mark data signal are sent by the master MCU to each slave MCU in the conference system, and forwarded by the slave MCU. After receiving the shared image data signal and the mark data signal, each conference terminal in the conference system superimposes the mark data signal onto the image data signal, and displays the signals.

If more MCUs are concatenated, the operation is similar. The master MCU in the concatenated conference system is responsible for collecting and forwarding the shared image data signals and the mark data signals of all the conference terminals in the conference system.

In this embodiment, if multiple MCUs are master MCUs, the MCU generates a control signal according to the time order of adding the mark data signals. Each master MCU forwards the received mark data signals to the receiving conference terminal sequentially according to the control signal. The receiving conference terminal superimposes the signal and displays it. A control token may be obtained according to the time order of adding the mark data signal. The control token may be obtained by the master MCU actively, or delivered by the controlling unit in the system. Each master MCU forwards the received mark data signal according to the control token, and each receiving conference terminal receives and superimposes the signals.

Fifth Embodiment of Conference System

Figure 22:
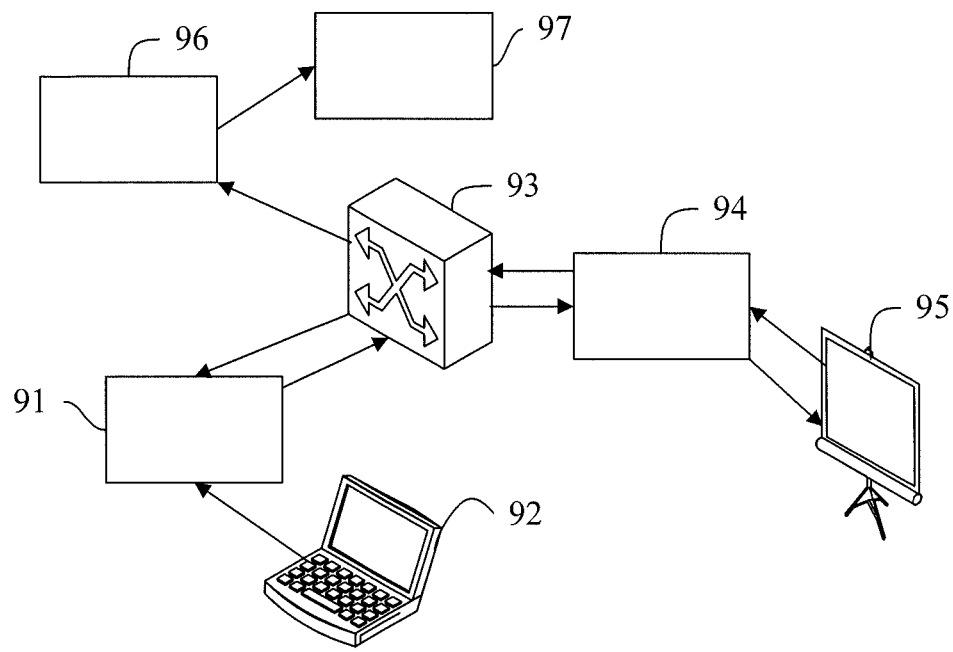
FIG. 22 is a schematic diagram of another structure of a conference system according to an embodiment of the present invention.

FIG. 22 is a schematic diagram of a structure of a conference system in the third application scenario mentioned above. The conference system includes: a conference terminal 91 and a notebook computer 92 connected with the conference terminal 91; a conference server 93; a conference terminal 94 and a display 95 with a touch screen, where the display 95 is connected with the conference terminal 94; a conference terminal 96, and an ordinary display 97 connected with the conference terminal 96. The number of conference terminals is not limited, and each conference terminal represents a conference site. The conference terminal 91 includes:

a second timer 46, configured to generate a second time interval value.

a first internal mark receiving module 4110, configured to: receive a mark data signal sent by a local conference terminal, output the mark data signal according to the first time interval value, and generate a first mark data signal;

a second internal mark receiving module 4120, configured to: receive the mark data signal sent by the local conference terminal, output the mark data signal according to the second time interval value, and generate a second mark data signal;

a first superimposing module 430, configured to superimpose the first mark data signal onto the image data signal to generate first hybrid image data; and a first sending module 440, configured to send the first hybrid image data to the display screen of the local conference terminal, or send the first hybrid image data to the conference server through an H.239 auxiliary stream channel.

The conference server 93 is configured to receive the first hybrid image data sent by the at least one conference terminal 94, and forward the first hybrid image data.

The conference terminal 96 and the conference terminal 91 are configured to receive, decode and display the first hybrid image data.

Specifically, this application scenario includes the following procedure:

(1) In the initial state, the conference terminal 91 is connected with the notebook computer, obtains the H.239 auxiliary stream token, and shares a slide with other conference sites through the H.239 auxiliary stream channel (which is equivalent to sending the shared slide to other terminals through the H.239 auxiliary stream channel). Therefore, both the conference terminal 94 and the conference terminal 96 see the slide of the conference terminal 91.

(2) When watching a slide, the user of the conference terminal 94 may want to make marks on the slide. To transmit the marks to others, the conference terminal 94 performs the following procedure:

(2.1) Apply for a control token of the H.239 auxiliary stream channel.

(2.2) Judge whether the conference controller (the current token owner) approves the application. If the conference controller approves the application, obtain the token, start recording the mark data signal of the touch screen 95 of the conference terminal 94, and superimpose the mark data signal onto the slide image displayed on the conference terminal 94.

(2.3) Encode the slide on which the mark data signal is superimposed.

(2.4) Send the encoded slide stream to the conference server 93 through an H.239 auxiliary stream channel.

In this case, the conference terminal 94 is a sender of the H.239 auxiliary stream. If a conference terminal on another conference site wants to add a mark, the conference terminal takes the same action. In this way, by switching the sending token of the H.239 auxiliary stream continuously, the conference terminal of each conference site can add its mark onto the slide.

However, in this system, the conference terminal 94 may also use the token control mode to separately send the mark added through the touch screen 95, and use the mark as the second H.239 auxiliary stream (the slide is the first H.239 auxiliary stream). For capability switching at the time of convening the conference, two parameters need to be added. One parameter indicates whether the second H.239 auxiliary stream is supported; and the other parameter indicates whether the second H.239 auxiliary stream is mark information.

If the second H.239 auxiliary stream is mark information, the token control mode is used by default. That is, the mark is sent also in the mode of applying for the token. In this solution, the "second H.239 auxiliary stream" is termed against the H.239 auxiliary stream of the slide, and may be any H.239 auxiliary stream in fact.

The procedure for sending a mark in token control mode is as follows:

(3.1) Apply for a control token of the mark as H.239 auxiliary stream.

(3.2) Obtain the token successfully, and start recording the mark data signal added through the touch screen 95.

(3.3) Send the mark data signal (mark track) of the user to the conference server 93 as separate H.239 auxiliary stream, and the conference server 93 forwards the H.239 auxiliary stream to other conference terminals.

In practice, the mode of using a token to control sending of the mark data signal may be combined with the mode of using a token to control the hybrid slide.

Sixth Embodiment of Conference System

Figure 23:
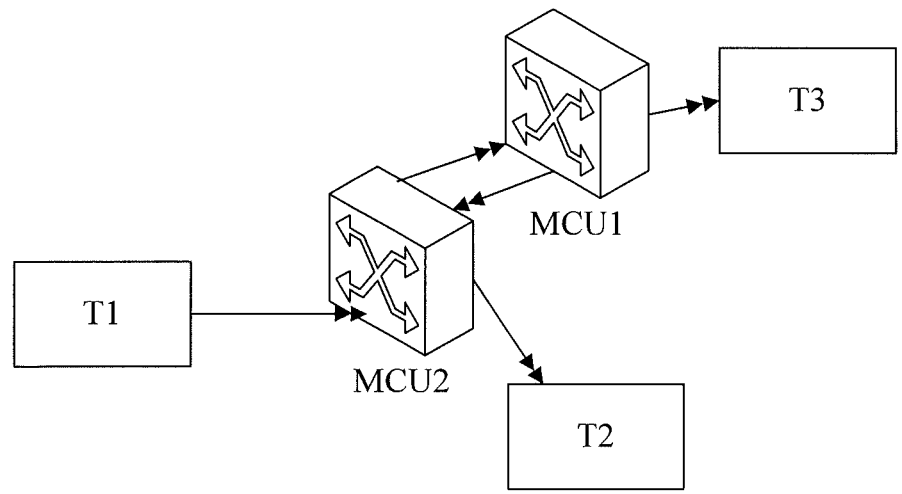
FIG. 23 is a schematic diagram of an application scenario of multiple MCUs concatenated in the conference system illustrated in FIG. 22.

FIG. 23 shows an application scenario with multiple concatenated conference servers in a conference system on the basis of the preceding fifth embodiment of the conference system. In FIG. 23, the double-headed arrow represents transmission of hybrid image data streams.

It is assumed that two MCUs are concatenated in the system, where MCU1 is a master MCU, and MCU2 is a slave MCU. If more than two MCUs are concatenated, the scenario is similar. That is, one of the MCUs is a master MCU, and other MCUs are slave MCUs.

The conference terminal T1 superimposes the local mark data signal onto the shared image data signal locally to generate hybrid image data, and then sends the hybrid image data to the MCU 2 through an H.239 auxiliary stream channel. The MCU2 forwards the hybrid image data to the master MCU (MCU 1) in the conference. The master MCU (MCU1) sends the received hybrid image data to each slave MCU in the conference system. The conference terminal connected with the slave MCU in the conference system receives the hybrid image data forwarded by the slave MCU.

If more MCUs are concatenated, the operation is similar. The hybrid image data sent to all conference terminals in the conference system is forwarded by the master MCU in the concatenated conference uniformly. Alternatively, all MCUs in the system are master MCUs, the hybrid image data is forwarded by the MCUs in specific order, and one of the MCUs is selected to forward the hybrid image data finally so that network congestion can be avoided.

In all the embodiments of the conference system, when data is transmitted between the conference terminal and the conference server, if network congestion or packet loss occurs, the network congestion or packet loss may be solved through the following approaches so that the user in the system has a better experience:

(1) Reliable transmission: For example, the large-sized data such as an image data signal and a hybrid image data signal is transmitted through the User Datagram Protocol (UDP) to prevent network congestion.

(2) Packet loss prevention technology: A packet loss recovery technology is used to transmit redundant data. When a small packet is lost, for example, the mark data signal is lost, because the size of the lost data is small, the receiver recovers the lost data by using the redundant data together with the received data. A reliable transmission protocol such as the Transmission Control Protocol (TCP) may be used to transmit data to ensure secure transmission of the mark data signal between devices. The mark data signal may also be transmitted through another reliable protocol such as UDP.

All the packet loss prevention technologies in the existing system can be applied to this interactive application to improve the application experience in the case of packet loss or network congestion.

When the mark data signal is sent by the conference terminal to the conference server, and forwarded by the conference server to another conference terminal, the mark data signal may be transmitted through the TCP protocol or the UDP protocol of the IP network, or through the High-Speed Multilayer Protocol (HMLP) protocol of the H.320 system. To ensure a real-time effect, the mark data signal is generally transmitted through UDP in the IP network.

Alternatively, on the MCU side or on the receiving conference terminal side, the time of receiving the data is recorded, and the mark data signal is superimposed onto the image data signal according to the order of the receiving time. In this way, the mark data signals added by each conference terminal can be superimposed correctly, and the user experience is improved. Alternatively, a timestamp is added to record the sending time when the conference terminal sends the image data signal and the mark data signal. The MCU can obtain the timestamp when receiving the image data signal or mark data signal. Especially, the mark data signal is superimposed onto the image data according to the time of sending the mark data signal. In this way, the mark data signal of each conference terminal can be superimposed onto the image data signal correctly, and the user experience and the interactivity are improved.

In the conference systems described above, no extra data conference system or device needs to be constructed in the process of interactive collaboration between the users; data collaboration between participants is implemented through the existing dual-stream function of the H.239 standard, and user interactivity and discussion efficiency are improved.

Method Embodiment

Figure 24:
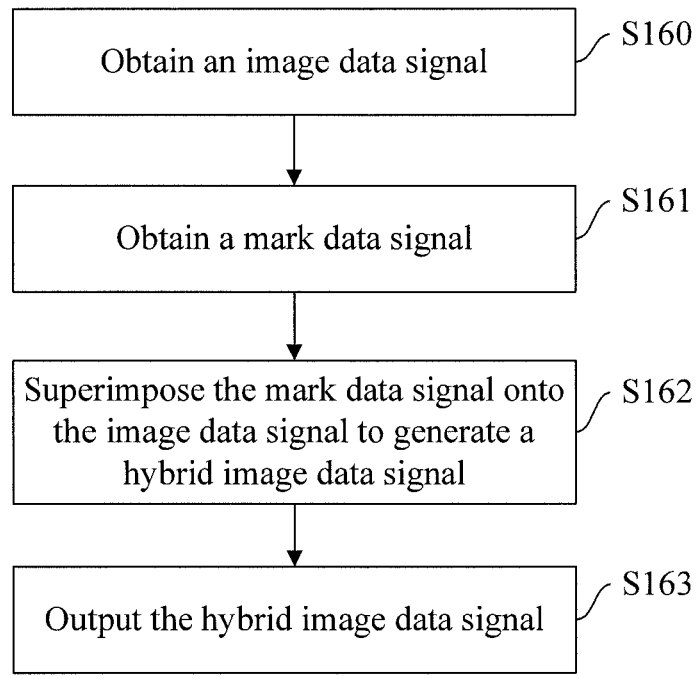
FIG. 24 is a schematic diagram of a flowchart of a data processing method according to an embodiment of the present invention.

As shown in FIG. 24, a data processing method is provided in this embodiment. The method includes:

Step S160: Obtain an image data signal.

Step S161: Obtain a mark data signal.

Step S162: Superimpose the mark data signal onto the image data signal to generate a hybrid image data signal.

Step S163: Output the hybrid image data signal. The hybrid image data signal may be output to a local conference terminal for displaying, or output to a conference server which forwards the hybrid image data to another conference terminal.

In the foregoing method, the mark data signal is superimposed onto the obtained image data signal to generate a hybrid image data signal (for example, the hybrid image data signal is a slide with added marks). In this way, a participant can add marks onto the slide when watching the slide, the interactivity between the videoconference users is improved, and the discussion efficiency is improved.

The following is a detailed process of implementing the method shown in FIG. 24:

Step S170: Obtain an image data signal.

Step S171: Obtain a mark data signal input by a local conference terminal.

Step S172: Generate a first time interval value.

Step S173: Generate a second time interval value.

Step S174: Output the mark data signal according to the first time interval value, and generate a first mark data signal.

Step S175: Output the mark data signal according to the second time interval value, generate a second mark data signal, encode the second mark data signal, and generate a third mark data signal.

Step S176: Judge whether a mark auxiliary stream is supported. If a mark auxiliary stream is supported, perform step S177; if a mark auxiliary stream is not supported, perform step S178 or send the third mark data signal through a user-defined channel.

Step S177: Apply for a conference site token in an H.239 auxiliary stream channel. After the conference site token is obtained successfully, generate a first control signal, and send the third mark data signal to the conference server through an H.239 auxiliary stream channel according to the first control signal.

Step S178: Apply for a conference site token in another H.239 auxiliary stream channel. After the conference site token is obtained successfully, generate a second control signal, and superimpose the first mark data signal onto the image data signal to generate the first hybrid image data according to the second control signal.

Step S179: Send the first hybrid image data to the display screen of the local conference terminal, or send the first hybrid image data to the conference server through an H.239 auxiliary stream channel, and the first hybrid image data is forwarded by the conference server to another conference terminal.

In the implementation process, step S171 may be preceded by this step: Receive a subtoken application of an input device on the conference site where the local conference terminal is located, and allocate a subtoken to the input device after confirming success of applying for the subtoken. In this case, step S171 may be: Obtain the mark data signal of the input device on the conference site where the local conference terminal is located according to the subtoken.

Besides, if the received mark data signal is sent by another terminal, another detailed process of implementing the method shown in FIG. 24 is as follows:

Step S180: Obtain an image data signal.

Step S181: Obtain the mark data signals sent by at least one conference terminal except the local conference terminal and forwarded by the conference server. Specifically, such mark data signals may be received in real time or manually.

Step S182: Generate a first time interval value.

Step S183: Decode the mark data signals of the at least one conference terminal respectively, and generate a mark data signal queue.

Step S184: Output the mark data signals according to the first time interval value and the order of the mark data signal queue, and generate at least one first mark data signal.

Step S185: Superimpose the first mark data signal onto the image data signal to generate a second hybrid image data signal.

Step S186: Send the second hybrid image data to the display screen of the local conference terminal.

Each of the mark data signals includes: a conference number, a conference terminal number, and content of the mark data signal. The conference number and the conference terminal number are designed to enable the receiver to identify the mark data signal sent by each specific conference terminal in the superimposition process; and the content of the mark data signal is expressed by a vector graph, a binary bitmap, a YUV chromatic bitmap, or an RGB chromatic bitmap. If the content of the mark data signal is expressed by a vector graph or a binary bitmap, the conference server may allocate a filling color to each conference terminal randomly, and the superimposing module of the conference terminal uses the color allocated by the conference server for filling when superimposing the tracks of different conference sites. If the content of the mark data signal is expressed by a chromatic bitmap such as YUV or RGB, a transparent color needs to be specified in the system uniformly so that the receiver can identify the location of the mark data signal correctly and superimpose it onto the slide.

Another Method Embodiment

Figure 25:
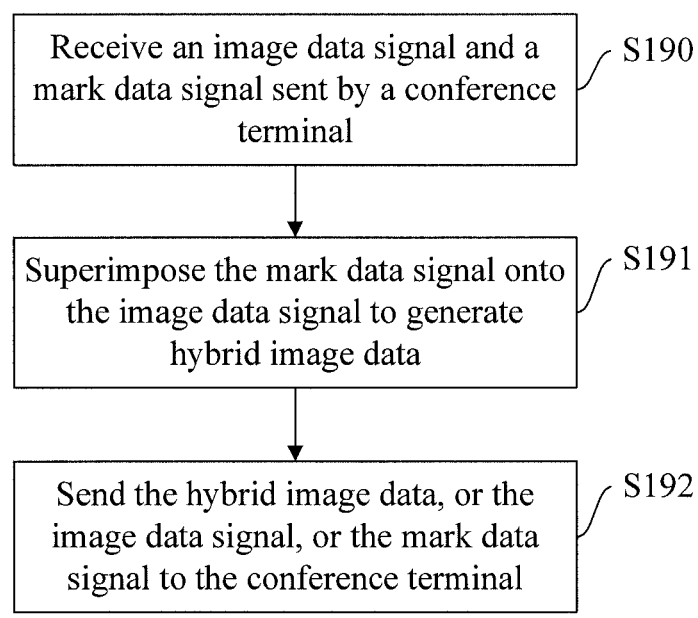
FIG. 25 is a schematic diagram of another flowchart of a data processing method according to an embodiment of the present invention.

As shown in FIG. 25, another data processing method is provided in this embodiment. The method includes:

Step S190: Receive an image data signal and a mark data signal that are sent by a conference terminal.

Step S191: Superimpose the mark data signal onto the image data signal to generate hybrid image data.

Step S192: Send the hybrid image data, or the image data signal, or the mark data signal to the conference terminal.

Step S191 includes:

allocating a filling color or a transparent color to the mark data signal, and using the filling color or transparent color to process the mark data signal and generate a chromatic mark data signal, where the content of the mark data signal may be expressed by a vector graph, a binary bitmap, a YUV chromatic bitmap, or an RGB chromatic bitmap; and superimposing the chromatic mark data signal onto the image data signal to generate hybrid image data.

If the content of the mark data signal is expressed by a vector graph or a binary bitmap, the MCU may allocate a filling color to the mark data signal of each conference terminal randomly, and the superimposing module of the conference terminal uses the allocated filling color for filling when superimposing the tracks of different conference sites.

If the mark data signal is expressed by a chromatic bitmap such as a YUV or RGB bitmap, the MCU needs to specify a transparent color so that the receiving conference terminal can identify the location of the track correctly, and that the integrity of the hybrid image data of each conference site is ensured after the mark data signal is superimposed onto the image data signal.

Before step S192, the following step may also be included: Receive a conference site token application sent by the conference terminal, and return a conference site token to the conference terminal after confirming success of applying for the conference site token. In this case, step S192 is as follows: When sending the hybrid image data or the mark data signal to the conference terminal according to the conference site token, the conference server may select an H.239 auxiliary stream channel, and send the hybrid image data or the mark data signal to the conference terminal through the H.239 auxiliary stream channel. The system supports the H.239 protocol, the system structure is simple, and every conference terminal in the conference system can see the marks added by other conference terminals. Collaboration between participants is implemented, and the user interactivity and discussion efficiency are improved.

Persons of ordinary skill in the art understand that all or part of the steps of the method provided in any of the preceding embodiments may be implemented by a program instructing relevant hardware. The program may be stored in a computer readable storage medium. When the program runs, the steps in the foregoing method embodiments are performed.

Although the invention is described through some exemplary embodiments, the invention is not limited to such embodiments. It is apparent that those skilled in the art can make modifications and variations to the invention without departing from the spirit and scope of the invention. The invention is intended to cover the modifications and variations provided that they fall within the scope of protection defined by the following claims or their equivalents.

What is claimed is:

1. A conference terminal, comprising:
a first timer, configured to generate a first time interval value;
a first internal mark obtaining module, configured to obtain an original mark data signal from a conference server, and generate a first mark data signal according to the first time interval value;
an image obtaining module, configured to obtain an image data signal from the conference server;
a superimposing module, configured to superimpose the first mark data signal onto the image data signal to generate a hybrid image data signal; and
an outputting module, configured to output the hybrid image data signal.

2. The conference terminal according to claim 1, further comprising:
a second timer, configured to generate a second time interval value; and
a second internal mark obtaining module, configured to obtain the original mark data signal from the conference server, and generate a second mark data signal according to the second time interval value.

3. The conference terminal according to claim 2, further comprising:
a mark encoding module, configured to encode the second mark data signal, and generate a third mark data signal; and a mark sending module, configured to send the third mark data signal to the conference server through an auxiliary stream channel or a user-defined channel.

4. The conference terminal according to claim 3, further comprising:
a first token controlling module, configured to apply for a first conference site token in an auxiliary stream channel, and generate a first control signal after obtaining the conference site token successfully; and
a second token controlling module, configured to apply for a second conference site token in the auxiliary stream channel, and generate a second control signal after obtaining the conference site token successfully.

5. The conference terminal according to claim 4, wherein
in superimposing the first mark data signal onto the image data signal, the superimposing module is configured to:
superimpose the first mark data signal onto the image data signal according to the first control signal to generate a first hybrid image data signal, and superimpose the first mark data signal onto the image data signal according to the second control signal to generate a second hybrid image data signal; and
in outputting the hybrid image data signal, the outputting module is configured to:
send the first hybrid image data signal to a display screen of a local conference terminal, or send the second hybrid image data signal to the conference server through the auxiliary stream channel.

6. The conference terminal according to claim 2, wherein the first and the second internal mark obtaining modules are real-time mark obtaining modules, configured to obtain the original mark data signal in real time; and
the image obtaining module is
a real-time image obtaining module, configured to obtain the image data signal in real time.

7. The conference terminal according to claim 2, wherein the first and the second internal mark obtaining modules are manual mark obtaining modules, configured to provide a manual receiving option, and obtain the original mark data signal manually when the manual receiving option is selected; and
the image obtaining module is
a manual image obtaining module, configured to provide a manual receiving option, and obtain the image data signal manually when the manual receiving option is selected.

8. A conference terminal, comprising:
an image obtaining module, configured to obtain an image data signal;
a first timer, configured to generate a first time interval value;
a second timer, configured to generate a second time interval value;
a first internal mark obtaining module, configured to obtain an original mark data signal from a local conference terminal, and output a first mark data signal according to the first time interval value;
a second internal mark obtaining module, configured to obtain the original mark data signal from the local conference terminal, and output a second mark data signal according to the second time interval value;
a superimposing module, configured to superimpose the first mark data signal onto the image data signal to generate a hybrid image data signal;
an outputting module, configured to output the hybrid image data signal;

a mark encoding module, configured to encode the second mark data signal, and generate a third mark data signal;
a first token controlling module, configured to apply for a conference site token in an auxiliary stream channel, and generate a first control signal after obtaining the conference site token successfully; and
a mark sending module, configured to send the third mark data signal to a conference server through the auxiliary stream channel or a user-defined channel according to the first control signal.

9. The conference terminal according to claim 8, further comprising:
a token managing module, configured to receive a subtoken application of an input device in a conference site where the local conference terminal is located, and allocate a subtoken to the input device after confirming success of applying for the subtoken;
wherein
the first internal mark obtaining module obtains the original mark data signal of the input device in the conference site where the local conference terminal is located, and outputs the first mark data signal according to the first time interval value; and
the second internal mark obtaining module obtains, according to the subtoken, the original mark data signal of the input device in the conference site where the local conference terminal is located, and outputs the second mark data signal according to the second time interval value.

10. The conference terminal according to claim 9, further comprising:
a private token controlling module, configured to receive a private token application sent by an input device in the conference site where the local conference terminal is located to perform a private conference with a target input device, and use an auxiliary stream channel or a user-defined channel to allocate a private token to the input device after confirming success of applying for the private token.

11. A conference server, comprising:
an image data receiving module, configured to receive an image data signal from a conference terminal;
a mark receiving module, configured to receive a mark data signal from the conference terminal;
a superimposing module, configured to superimpose the mark data signal onto the image data signal to generate a hybrid image data signal;
a token managing module, configured to receive a conference site token application from the conference terminal, and return a conference site token to the conference terminal after confirming success of applying for the conference site token;
a sending module, configured to send the hybrid image data signal, or the image data signal, or the mark data signal to a conference terminal of another conference site according to the conference site token; and
a sending controlling module, configured to select an auxiliary stream channel according to the conference site token, and control the sending module to send the hybrid image data signal, or the image data signal or the mark data signal to another conference terminal or another conference server through the auxiliary stream channel;
wherein the superimposing module comprises:
a filling module, configured to allocate a filler color or a transparent color to the mark data signal, and use the filler color or the transparent color to process the mark data signal and generate a colored mark data signal; and
a processing module, configured to superimpose the colored mark data signal onto the image data signal to generate the hybrid image data signal.

12. A conference system, comprising a first conference terminal, a conference server, and at least one second conference terminal, wherein:
the first conference terminal comprises:
an image obtaining module, configured to obtain an image data signal forwarded by the conference server; and
a mark sending module, configured to obtain a mark data signal, and send the mark data signal to the conference server;
the conference server comprises:
an image data receiving module, configured to receive the image data signal sent by any conference terminal in the system;
a mark receiving module, configured to receive the mark data signal;
a superimposing module, configured to superimpose the mark data signal onto the image data signal to generate a hybrid image data signal; and
a sending module, configured to send the hybrid image data signal to the first conference terminal and the at least one second conference terminal;
the at least one second conference terminal is configured to receive and display the hybrid image data
wherein the system further comprises:
a controlling unit, configured to obtain sending time of the mark data signal, and generate a control signal according to order of the sending time of the mark data signal;
wherein the conference servers are at least two conference servers concatenated, and the at least two conference servers are all master conference servers; and
wherein the at least two master conference servers obtain a control token according to the control signal, and the superimposing module superimposes the mark data signal onto the image data signal according to the control token to generate the hybrid image data signal.

13. A conference system, comprising a first conference terminal, a conference server, and at least one second conference terminal, wherein
the first conference terminal comprises:
an image obtaining module, configured to obtain an image data signal sent by the conference server; and
a mark sending module, configured to obtain a mark data signal, and send the mark data signal to the conference server;
the conference server is configured to receive the image data signal and the mark data signal, and forward the signals;
the at least one second conference terminal comprises:
a first timer, configured to generate a first time interval value;
an image obtaining module, configured to obtain the image data signal forwarded by the conference server;
a first external mark obtaining module, configured to obtain the mark data signal forwarded by the conference server, output the mark data signal according to the first time interval value, and generate a first mark data signal;
a first superimposing module, configured to superimpose the first mark data signal onto the image data signal to generate a first hybrid image data signal; and
a displaying module, configured to display the first hybrid image data signal.

14. The conference system according to claim 13, wherein the first external mark obtaining module comprises:

a first external mark obtaining submodule, configured to obtain mark data signals sent by at least one another conference terminal and forwarded by the conference server;
at least one decoder, configured to decode the mark data signals of the at least one another conference terminal respectively, and generate a mark data signal queue; and
a mark outputting module, configured to output the mark data signals according to the first time interval value and order of the mark data signal queue, and generate at least one first mark data signal.

15. The conference system according to claim 13, wherein the conference servers are at least two concatenated conference servers.

16. The conference system according to claim 15, wherein the at least two conference servers comprise one master conference server and at least one slave conference server;
the master conference server sends the image data signal and the mark data signal to the at least one slave conference server and a conference terminal connected to the master conference server; and
the slave conference server sends the received image data signal or the mark data signal to a conference terminal connected to the slave conference server.

17. The conference system according to claim 15, wherein the at least two conference servers are master conference servers, and the system further comprises:
a controlling unit, configured to obtain sending time of the mark data signal, and generate a control signal according to order of the sending time of the mark data signal;
the at least two master conference servers forward the image data signal and the mark data signal according to the control signal.

18. The conference system according to claim 17, wherein the at least two master conference servers obtain a control token according to the control signal, and forward the image data signal and the mark data signal according to the control token.

19. A conference system, comprising a first conference terminal, a conference server, and at least one second conference terminal, wherein
the first conference terminal comprises:
a first timer, configured to generate a first time interval value;
a second timer, configured to generate a second time interval value;
a first internal mark obtaining module, configured to obtain a mark data signal sent by a local conference terminal, output the mark data signal according to the first time interval value, and generate a first mark data signal;
a second internal mark obtaining module, configured to obtain the mark data signal sent by the local conference terminal, output the mark data signal according to the second time interval value, and generate a second mark data signal;
a second superimposing module, configured to superimpose the first mark data signal onto the image data signal to generate second hybrid image data; and
a second sending module, configured to send the first hybrid image data to a display screen of the local conference terminal, or send the second hybrid image data to the conference server through an auxiliary stream channel;
the conference server is configured to receive and forward the second hybrid image data; and
the at least one second conference terminal is configured to receive and display the second hybrid image data.

20. The conference system according to claim 19, wherein the first conference terminal further comprises:
a second token controlling module, configured to apply for a conference site token in another auxiliary stream channel, and generate a second control signal after obtaining the conference site token successfully;
the second superimposing module superimposes the first mark data signal onto the image data signal according to the second control signal to generate second hybrid image data.

21. The conference system according to claim 19, wherein the conference servers are at least two concatenated conference servers.

22. The conference system according to claim 21, wherein the at least two conference servers comprise one master conference server and at least one slave conference server;
the master conference server sends the second hybrid image data to the at least one slave conference server and a conference terminal connected to the master conference server; and
the slave conference server sends the received second hybrid image data to a conference terminal connected to the slave conference server.

23. A data processing method performed by a conference terminal, comprising:
obtaining an image data signal;
obtaining an original mark data signal from a local conference terminal;
generating a first time interval value and a second time interval value;
outputting a first mark data signal according to the first time interval value, and outputting a second mark data signal according to the second time interval value;
encoding the second mark data signal, and generating a third mark data signal;
applying for a token in an auxiliary stream channel, and generating a first control signal after obtaining the token successfully;
sending the third mark data signal to a conference server through the auxiliary stream channel according to the first control signal;
superimposing the first mark data signal onto the image data signal to generate a hybrid image data signal; and
outputting the hybrid image data signal.

24. The data processing method according to claim 23, wherein:
before obtaining the mark data signal sent by the local conference terminal, the method further comprises:
receiving a subtoken application of an inputting device on a conference site where the local conference terminal is located, and allocating a subtoken to the input device after confirming success of applying for the subtoken;
and wherein obtaining the mark data signal from the local conference terminal comprises:
obtaining the mark data signal input by the inputting device on the conference site where the local conference terminal is located according to the subtoken.

25. A data processing method performed by a conference terminal, comprising:
generating a first time interval value;
obtaining an original mark data signal from a conference server, and generating a first mark data signal according to the first time interval value;
obtaining an image data signal from the conference server;

superimposing the first mark data signal onto the image data signal to generate a hybrid image data signal; and outputting the hybrid image data signal.

26. A data processing method performed by a conference server, comprising:

receiving an image data signal and a mark data signal from a conference terminal;

receiving a conference site token application from the conference terminal, and returning a conference site token to the conference terminal after confirming success of applying for the conference site token;

superimposing the mark data signal onto the image data signal to generate a hybrid image data signal; and selecting an auxiliary stream channel, and sending the hybrid image data signal, or the image data signal, or the mark data signal through the auxiliary stream channel to a conference terminal of another conference site according to the conference site token; wherein the step of superimposing the mark data signal onto the image data signal comprises:

allocating a filler color or a transparent color to the mark data signal, and using the filler color or the transparent color to process the mark data signal and generate a colored mark data signal; and superimposing the colored mark data signal onto the image data signal to generate the hybrid image data signal.

* * * * *